United States Patent
Fukuda et al.

(10) Patent No.: US 10,247,300 B2
(45) Date of Patent: Apr. 2, 2019

(54) METHOD AND DEVICE FOR CONTROLLING AUTOMATIC TRANSMISSION

(71) Applicant: Mazda Motor Corporation, Aki-gun, Hiroshima (JP)

(72) Inventors: Yutaro Fukuda, Hiroshima (JP); Manabu Sasahara, Hiroshima (JP); Tadashi Saito, Hiroshima (JP); Tomohiro Kubo, Hiroshima (JP)

(73) Assignee: Mazda Motor Corporation, Aki-gun, Hiroshima (JP)

( * ) Notice: Subject to any disclaimer, the term of this patent is extended or adjusted under 35 U.S.C. 154(b) by 23 days.

(21) Appl. No.: 15/596,357

(22) Filed: May 16, 2017

(65) Prior Publication Data

US 2017/0335951 A1    Nov. 23, 2017

(30) Foreign Application Priority Data

May 19, 2016   (JP) .................................. 2016-100132

(51) Int. Cl.
*F16H 3/66* (2006.01)
*F16H 61/00* (2006.01)
(Continued)

(52) U.S. Cl.
CPC ......... *F16H 61/0021* (2013.01); *F16H 61/30* (2013.01); *F16H 61/36* (2013.01);
(Continued)

(58) Field of Classification Search
CPC ...... F16H 61/0021; F16H 61/36; F16H 61/30; F16H 63/3026; F16H 59/74;
(Continued)

(56) References Cited

U.S. PATENT DOCUMENTS

2012/0149519 A1* 6/2012 Meyer ................ F16D 25/0638
475/116
2015/0217773 A1* 8/2015 Nakano ................ B60W 10/06
477/107
(Continued)

FOREIGN PATENT DOCUMENTS

JP      H08014076 A    1/1996
JP      2011208699 A   10/2011

*Primary Examiner* — David J Hlavka
(74) *Attorney, Agent, or Firm* — Alleman Hall Creasman & Tuttle LLP

(57) ABSTRACT

A method of controlling an automatic transmission mounted on a vehicle having an automatic engine stop mechanism for automatically stopping and restarting an engine, is provided. The transmission includes a piston having first and second surfaces, friction plates, engaging and disengaging hydraulic pressure chambers, a hydraulic pressure control valve for supplying/discharging hydraulic pressure to/from the chambers, first and second oil paths communicating the control valve with the chambers, a pressure reducing valve for preventing pressure of the disengaging chamber from exceeding a given set pressure, a hydraulic pressure supply device for supplying pressure to the control valve in the automatic stop state, and a mechanical oil pump for supplying pressure to the control valve while the engine is driving, the second surface having a larger pressure receiving area than the first surface. The method includes adjusting the set pressure to be lower in the automatic stop state than while driving.

18 Claims, 15 Drawing Sheets

(51) Int. Cl.
*F16H 61/30* (2006.01)
*F16H 63/30* (2006.01)
*F16H 61/36* (2006.01)
*F16H 59/74* (2006.01)

(52) U.S. Cl.
CPC ........... *F16H 63/3026* (2013.01); *F16H 3/66* (2013.01); *F16H 59/74* (2013.01); *F16H 2059/746* (2013.01); *F16H 2063/303* (2013.01); *F16H 2200/006* (2013.01); *F16H 2200/2012* (2013.01); *F16H 2200/2043* (2013.01)

(58) Field of Classification Search
CPC ....... F16H 2059/746; F16H 2200/2043; F16H 2063/303; F16H 2200/006; F16H 3/66
See application file for complete search history.

(56) References Cited

U.S. PATENT DOCUMENTS

| | | | |
|---|---|---|---|
| 2016/0033032 A1* | 2/2016 | Takagi | F16H 61/0031 475/117 |
| 2017/0284424 A1* | 10/2017 | Kawaura | F15B 1/024 |
| 2018/0058604 A1* | 3/2018 | Noda | B60K 17/046 |

* cited by examiner

|  | CL1 (31) | CL2 (32) | CL3 (33) | BR1 (21) | BR2 (22) |
|---|---|---|---|---|---|
| 1ST GEAR | O |  |  | O | O |
| 2ND GEAR |  | O |  | O | O |
| 3RD GEAR | O | O |  |  | O |
| 4TH GEAR |  | O | O |  | O |
| 5TH GEAR | O |  | O |  | O |
| 6TH GEAR | O | O | O |  |  |
| 7TH GEAR | O |  | O | O |  |
| 8TH GEAR |  | O | O | O |  |
| REVERSE GEAR |  |  | O | O | O |

FIG. 2

METHOD AND DEVICE FOR CONTROLLING AUTOMATIC TRANSMISSION

BACKGROUND

The present invention relates to a method and device for controlling an automatic transmission particularly mounted on a vehicle having an automatic stop mechanism of an engine.

Recently, vehicles equipped with a mechanism for automatically stopping an engine while waiting for a traffic light, etc. (idle stop mechanism) have been developed and put into practical use in order to reduce environmental loads, such as a fuel consumption. It is proposed that such a vehicle equipped with the automatic engine stop mechanism be provided with a mechanical oil pump using the engine as a drive source and, additionally, a hydraulic pressure supply device such as an electric oil pump or a hydraulic accumulator, in order to supply hydraulic pressure to an automatic transmission. JPH08-014076A discloses one example of such a vehicle.

When the hydraulic pressure is supplied to the automatic transmission by the mechanical oil pump alone, frictional engageable elements of the automatic transmission are disengaged when the engine is automatically stopped, which may cause an engaging shock due to a response delay when restarting the engine. In order to reduce this engaging shock, JPH08-014076A proposes a vehicle provided with a hydraulic pressure supply device in addition to a mechanical oil pump for supplying hydraulic pressure to frictional engageable elements.

In addition, in order to reduce a shock caused in a vehicle in an engine restart, JP2011-208699A proposes a configuration of reducing hydraulic pressure that is supplied from a hydraulic pressure supply device (an electric oil pump or a hydraulic accumulator) to engage frictional engageable elements, while an engine is automatically stopped. In this manner, the shock caused in the vehicle by a torque fluctuation occurring in the engine restart and being transmitted to drive wheels can be reduced.

Although a certain level of the shock caused in the vehicle in the engine restart may be reduced by the configuration proposed in JP2011-208699A, a response delay at the time of an engaging operation of an automatic transmission becomes another problem. That is, according to the configuration proposed in JP2011-208699A, since the hydraulic pressure supplied from the hydraulic pressure supply device is kept low while the engine is automatically stopped, obtaining a suitable engaging force at the engine restart takes time. Therefore, this configuration may cause the response delay at the time of the engaging operation of the automatic transmission in the engine restart.

SUMMARY

The present invention is made in view of the above issues and aims to provide a method and device for controlling an automatic transmission, which reduce the size of a hydraulic pressure supply device and are capable of reducing a shock caused in a vehicle in an engine restart, and also reducing a response delay at the time of an engaging operation of the automatic transmission.

According to one aspect of the present invention, a method of controlling an automatic transmission mounted on a vehicle having an automatic engine stop mechanism for automatically stopping an engine when a given automatic stop condition is satisfied, and automatically starting the engine when a given restart condition is satisfied in a state where the engine is automatically stopped is provided. The automatic transmission that is the control target has the following structure.

The automatic transmission includes a piston, a plurality of friction plates, an engaging hydraulic pressure chamber, a disengaging hydraulic pressure chamber, a hydraulic pressure control valve, a first oil path, a second oil path, a pressure reducing valve, a hydraulic pressure supply device, and a mechanical oil pump. The piston has a first surface and a second surface opposite from each other in axial directions of the piston, and movable in the axial directions.

The plurality of friction plates are disposed on the first surface side of the piston. The engaging hydraulic pressure chamber applies hydraulic pressure to the second surface of the piston and directs the piston to an engaging position to push the friction plates to be engaged with each other in an engaged state.

The disengaging hydraulic pressure chamber applies hydraulic pressure to the first surface of the piston and directs the piston to a disengaging position to cause the friction plates to be a disengaged state. The hydraulic pressure control valve has an output port of hydraulic pressure, and supplies and discharges hydraulic pressure to and from the engaging hydraulic pressure chamber and the disengaging hydraulic pressure chamber.

The first oil path communicates the output port of the hydraulic pressure control valve with the engaging hydraulic pressure chamber. The second oil path communicates the output port with the disengaging hydraulic pressure chamber.

The pressure reducing valve is disposed in the second oil path and prevents hydraulic pressure of the disengaging hydraulic pressure chamber from exceeding a given set pressure (release pressure).

The hydraulic pressure supply device supplies hydraulic pressure to an input port of the hydraulic pressure control valve when the engine is in the automatic stop state. The mechanical oil pump uses the engine as a drive source and supplies hydraulic pressure to the input port while the engine is driving.

In the automatic transmission according to this aspect, the second surface has a larger area for receiving hydraulic pressure than an area of the first surface for receiving hydraulic pressure.

The control method of the automatic transmission according to this aspect includes adjusting the set pressure of the pressure reducing valve to be lower when the engine is in the automatic stop state than while the engine is driving.

In the automatic transmission described above, the first and second surfaces of the piston have different pressure receiving areas. Thus, a pushing force of the piston regarding the engagement of the friction plates is defined by an integration of the hydraulic pressure of the engaging hydraulic pressure chamber, the hydraulic pressure of the disengaging hydraulic pressure chamber, and the difference between the pressure receiving areas.

In addition, in this aspect, the pressure reducing valve is disposed in the second oil path and prevents hydraulic pressure of the disengaging hydraulic pressure chamber from exceeding a given set pressure. Therefore, the pushing force of the piston regarding the engagement of the friction plates after the pressure reducing valve starts a pressure limiting operation (pressure reducing operation) is expressed by ((pressure receiving area of second surface)×

(hydraulic pressure of engaging hydraulic pressure chamber)−(pressure receiving area of first surface)×(set pressure of pressure reducing valve)).

Further, with the control method according to this aspect, the set pressure of the pressure reducing valve is adjusted to be lower when the engine is in the automatic stop state than while the engine is driving. Thus, according to this aspect, even when the supply hydraulic pressure of the hydraulic pressure supply device is lower than that of the mechanical oil pump, by accordingly reducing the set pressure of the pressure reducing valve, the pushing force of the piston when the engine is in the automatic stop state is maintained to be the same as the pushing force while the engine is driving.

In this manner, according to the control method of this aspect, the hydraulic pressure supplied from the hydraulic pressure supply device in the automatic stop state of the engine is kept low, thereby the hydraulic pressure supply device is reduced in size. Additionally, since the engaged state of the friction plates is maintained also in the automatic stop state of the engine, a shock caused in a vehicle in an engine restart is reduced.

Further, with the control method, even in the automatic stop state of the engine, the pushing force of the piston regarding the engagement of the friction plates is maintained the same as that during the engine drive. Therefore, a response delay at the time of the engaging operation of the automatic transmission in the engine restart, which occurs with the configuration of JP2011-208699A, is reduced.

Therefore, according to the control method of this aspect, the size reduction of the hydraulic pressure supply device is achieved, and the vehicle shock in the engine restart and the response delay at the time of the engaging operation of the automatic transmission are reduced.

The hydraulic pressure supply device may be an electric oil pump. In such a case where the electric device is applied as the hydraulic pressure supply device, power consumption of the electric oil pump in the automatic stop state of the engine is reduced. That is, when attempting to obtain in the automatic stop state of the engine the engagement force same as during the engine drive as described above, the hydraulic pressure of the engaging hydraulic pressure chamber is kept low, thereby the reduction of the power consumption of the electric oil pump is achieved. Note that when a hydraulic accumulator is adopted as the hydraulic pressure supply device, it does not consume power in the automatic stop state of the engine, which is more suitable in terms of the reduction of the power consumption in the automatic stop state of the engine.

When the engine is in the automatic stop state, hydraulic pressure may be supplied from the hydraulic pressure supply device so as to cause the friction plates to reach the engaged state. According to this configuration, the engaged state of the friction plates is surely maintained in the automatic stop state of the engine. Thus, the response delay at the time of the engaging operation of the automatic transmission in the engine restart is reduced more reliably.

Further, information regarding a gear range of the automatic transmission may be inputted. When the information regarding the gear range of the automatic transmission indicates a traveling range in the automatic stop state of the engine, the set pressure may be reduced to be lower than when the information indicates a non-traveling range.

According to this configuration, when the engine is automatically stopped in the traveling range (e.g., D-range), by maintaining the engagement force between the friction plates firmly, the vehicle shock is reduced in the restart of the engine and a smooth start of the vehicle is achieved. On the other hand, when the engine is automatically stopped in the non-traveling range (e.g., N-range), with the reduced engagement force between the friction plates, even when the engine is restarted in this state, a situation where the vehicle erroneously starts travelling is avoidable. Thus, according to the control method, a high level of safety is secured.

When the engine is in the automatic stop state, a state where oil is also charged into the disengaging hydraulic pressure chamber may be maintained. According to this configuration, a high responsiveness is obtained when the engine is restarted. In other words, in this aspect, as described above, the pushing force to the friction plates is defined by the hydraulic pressure of the engaging hydraulic pressure chamber, the hydraulic pressure of the disengaging hydraulic pressure chamber, and the difference between the pressure receiving areas of the first and second surfaces. Thus, by maintaining the state where hydraulic oil is charged into the disengaging hydraulic pressure chamber also in the automatic stop state, after the engine is restarted, an accurate control of the pushing force to the friction plates is possible without any response delay.

According to another aspect of the present invention, a method of controlling an automatic transmission mounted on a vehicle having an automatic engine stop mechanism for automatically stopping an engine when a given automatic stop condition is satisfied, and automatically starting the engine when a given restart condition is satisfied in a state where the engine is automatically stopped, is provided. The automatic transmission that is the control target has the same structure of the automatic transmission of the above aspect. That is, the automatic transmission includes a piston, a plurality of friction plates, an engaging hydraulic pressure chamber, a disengaging hydraulic pressure chamber, a hydraulic pressure control valve, a first oil path, a second oil path, a pressure reducing valve, a hydraulic pressure supply device, and a mechanical oil pump.

The method includes adjusting the set pressure of the pressure reducing valve to be lower in a first period of automatically starting the engine than in a period other than both of the first period and the period in which the engine is in the automatic stop state.

Also in this aspect, similar to the above aspect, a pushing force of the piston regarding the engagement of the friction plates is defined by an integration of the hydraulic pressures of the engaging and disengaging hydraulic pressure chambers and the difference between the pressure receiving areas. In addition, similar to the above aspect, the pressure reducing valve is disposed in the second oil path and a pushing force while the pressure reducing valve performs a pressure limiting operation (pressure reducing operation) is expressed by ((pressure receiving area of second surface)×(hydraulic pressure of engaging hydraulic pressure chamber)−(pressure receiving area of first surface)×(set pressure of pressure reducing valve)).

Further, with the control method, the set pressure of the pressure reducing valve is adjusted to be lower in a first period of automatically starting the engine than in a period other than both of the first period and the period in which the engine is in the automatic stop state. Thus, for the pushing force of the piston in the period of automatically starting the engine, also until the engine starts normal driving (the first period), the engaged state of the friction plates is stably maintained without being affected by a response delay of the hydraulic pressure at the time of startup of the mechanical oil pump.

Therefore, according to this aspect, a shock caused in a vehicle in an engine restart and a response delay at the time of an engaging operation of the automatic transmission are reduced.

According to another aspect of the present invention, a control device of an automatic transmission mounted on a vehicle having an automatic engine stop mechanism for automatically stopping an engine when a given automatic stop condition is satisfied, and automatically starting the engine when a given restart condition is satisfied in a state where the engine is automatically stopped, is provided. The automatic transmission that is the control target has the following structure.

The automatic transmission includes a piston, a plurality of friction plates, an engaging hydraulic pressure chamber, a disengaging hydraulic pressure chamber, a hydraulic pressure control valve, a first oil path, a second oil path, a pressure reducing valve, a hydraulic pressure supply device, and a mechanical oil pump. The piston has a first surface and a second surface opposite from each other in axial directions of the piston, and movable in the axial directions.

The plurality of friction plates are disposed on the first surface side of the piston. The engaging hydraulic pressure chamber applies hydraulic pressure to the second surface of the piston and directs the piston to an engaging position to push the friction plates to be engaged with each other in an engaged state.

The disengaging hydraulic pressure chamber applies hydraulic pressure to the first surface of the piston and directs the piston to a disengaging position to cause the friction plates to be a disengaged state. The hydraulic pressure control valve has an output port of hydraulic pressure, and supplies and discharges hydraulic pressure to and from the engaging hydraulic pressure chamber and the disengaging hydraulic pressure chamber.

The first oil path communicates the output port of the hydraulic pressure control valve with the engaging hydraulic pressure chamber. The second oil path communicates the output port with the disengaging hydraulic pressure chamber.

The pressure reducing valve is disposed in the second oil path and prevents hydraulic pressure of the disengaging hydraulic pressure chamber from exceeding a given set pressure.

The hydraulic pressure supply device supplies hydraulic pressure to an input port of the hydraulic pressure control valve when the engine is in the automatic stop state. The mechanical oil pump uses the engine as a drive source and supplies hydraulic pressure to the input port while the engine is driving.

In the automatic transmission according to this aspect, the second surface has a larger area for receiving hydraulic pressure than an area of the first surface for receiving hydraulic pressure.

The control device includes a processor configured to execute instructions to adjust the set pressure of the pressure reducing valve to be lower when the engine is in the automatic stop state than while the engine is driving, or to be lower in a first period of automatically starting the engine than in a period other than both of the first period and the period in which the engine is in the automatic stop state.

Therefore, according to the control device of the automatic transmission of this aspect, a size reduction of the hydraulic pressure supply device is achieved, and a shock caused in a vehicle in an engine restart and a response delay at the time of an engaging operation of the automatic transmission are reduced.

BRIEF DESCRIPTION OF THE DRAWINGS

FIG. 2 is an engaging combination table of frictional engageable elements of the automatic transmission.

FIGS. 12A and 12B are schematic views illustrating states of the second brake, in which FIG. 12A illustrates a state before the automatic stop and FIG. 12B illustrates a state in the automatic stop state.

DETAILED DESCRIPTION OF EMBODIMENTS

Hereinafter, embodiments of the present invention are described with reference to the accompanying drawings. Note that the following embodiments are merely some modes of the present invention, and the present invention is not to be limited to any parts of the following modes except for their essential structures and configurations.

<Embodiment>

Overall Structure of Automatic Transmission 1

Figure 1:
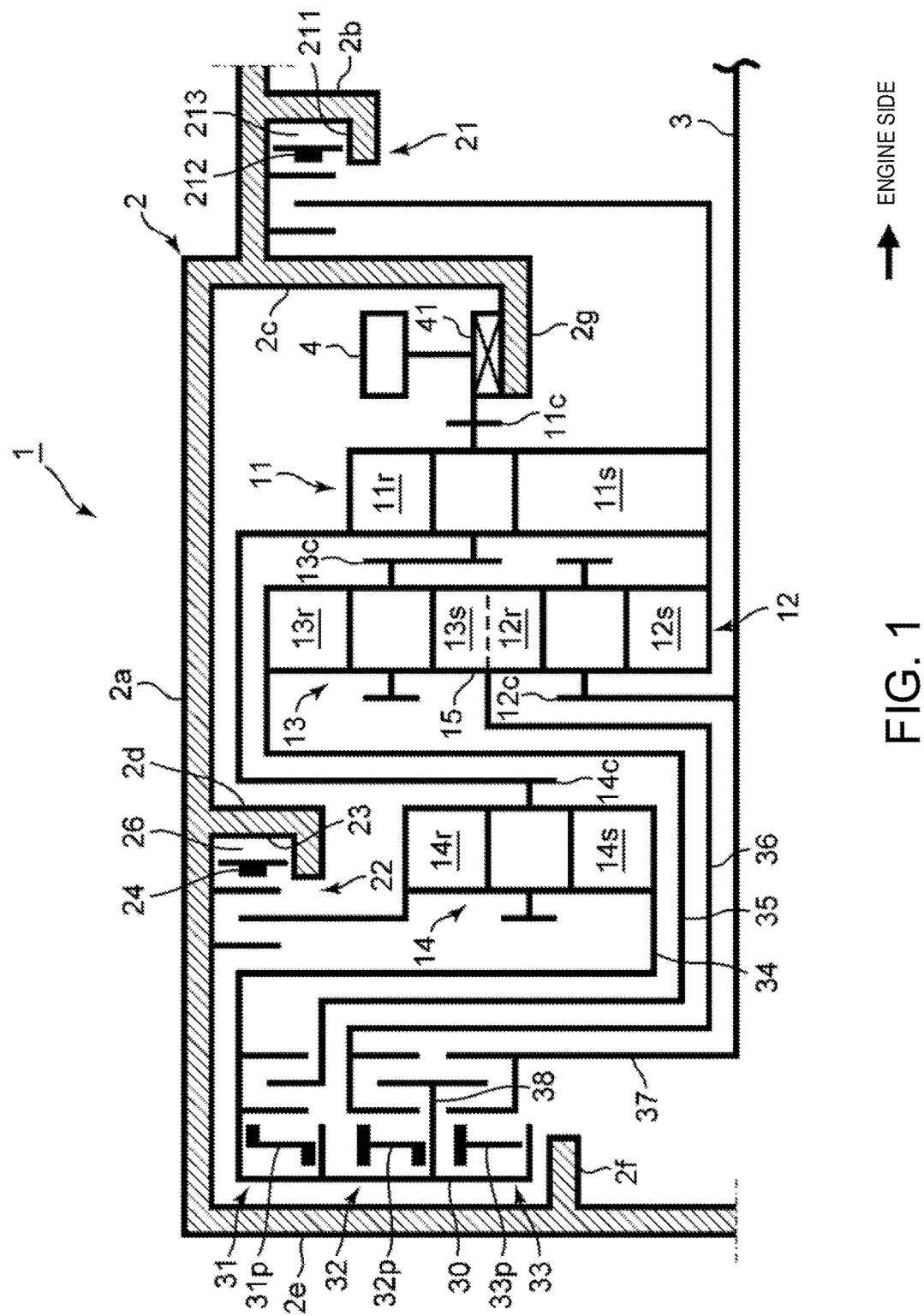
FIG. 1 is a substantial view of an automatic transmission according to one embodiment of the present invention.

FIG. 1 is a substantial view of an automatic transmission 1 for an automobile (vehicle) according to this embodiment. The automatic transmission 1 includes a transmission case 2. The automatic transmission 1 also includes an input shaft 3 extending from an engine side, an output gear 4, four planetary gear sets (first planetary gear set 11, second planetary gear set 12, third planetary gear set 13, and fourth planetary gear set 14), two brakes (first brake 21 and second brake 22), and three clutches (first clutch 31, second clutch 32, and third clutch 33), which are disposed in the transmission case 2. The four planetary gear sets, the two brakes, and the three clutches constitute a transmission mechanism.

The input shaft 3 receives drive force generated in the engine of the vehicle. The output gear 4 outputs driving force at a given gear ratio controlled by the transmission mechanism. In this embodiment, an example in which the automatic transmission receives drive force of the engine without using a torque converter (fluid transmitter) is described.

The transmission case 2 has an outer circumferential wall 2a, a first intermediate wall 2b provided on an engine-side end part of the outer circumferential wall 2a, a second intermediate wall 2c provided on a side of the first intermediate wall 2b opposite from the engine (counter-engine side), a third intermediate wall 2d provided in an intermediate portion of the outer circumferential wall 2a in axial directions of the input shaft 3, a side wall 2e provided on a counter-engine-side end part of the outer circumferential wall 2a, a boss part 2f extending from a center part of the side wall 2e to the engine side, and a cylindrical part 2g extending from an inner circumferential end of the second intermediate wall 2c to the counter-engine side.

The four planetary gear sets 11 to 14 are disposed from the engine side in the order of the first planetary gear set 11, the second (inner circumferential) and third (outer circumferential) planetary gear sets 12 and 13 disposed overlapping with each other in radial directions of the transmission case 2, and the fourth planetary gear set 14. The first planetary gear set 11 includes a carrier 11c, a pinion (not illustrated) supported by the carrier 11c, a sun gear 11s, and a ring gear 11r. The first planetary gear set 11 is a single pinion type in which the pinion is directly meshed with the sun gear 11s and the ring gear 11r. The second to fourth planetary gear sets 12 to 14 are also a single pinion type and include carrier 12c, 13c and 14c, pinions (not illustrated), sun gears 12s, 13s and 14s, and ring gears 12r, 13r and 14r, respectively.

The ring gear 12r of the second planetary gear set 12 and the sun gear 13s of the third planetary gear set 13 which are overlapped in the radial directions are integrally formed by, for example, welding or shrink-fitting. Thus, the ring gear 12r and the sun gear 13s are normally coupled to each other and form an integrated rotational element 15. The sun gear 11s of the first planetary gear set 11 is normally coupled to the sun gear 12s of the second planetary gear set 12, the ring gear 11r of the first planetary gear set 11 is normally coupled to the carrier 14c of the fourth planetary gear set 14, and the carrier 11c of the first planetary gear set 11 is normally coupled to the carrier 13c of the third planetary gear set 13. The input shaft 3 is normally coupled to the carrier 12c of the second planetary gear set 12. The output gear 4 is normally coupled to the carrier 11c of the first planetary gear set 11 and the carrier 13c of the third planetary gear set 13. The output gear 4 is rotatably supported to the cylindrical part 2g of the transmission case 2 via a bearing 41.

The sun gear 14s of the fourth planetary gear set 14 is coupled to a first rotational member 34 extending to the counter-engine side. Similarly, the ring gear 13r of the third planetary gear set 13 is coupled to a second rotational member 35 and the integrated rotational element 15 is coupled to a third rotational member 36. These rotational members 35 and 36 also extend to the counter-engine side.

The carrier 12c of the second planetary gear set 12 is coupled to a fourth rotational member 37 via the input shaft 3.

The first brake 21 is disposed on the first intermediate wall 2b of the transmission case 2. The first brake 21 includes a cylinder 211, a piston 212 fitted into the cylinder 211, and a hydraulic oil pressure chamber 213 defined by the cylinder 211 and the piston 212. When a given engaging hydraulic pressure is supplied to the hydraulic oil pressure chamber 213, a friction plate of the first brake 21 is engaged and the first brake 21 fixes the sun gear 11s of the first planetary gear set 11 and the sun gear 12s of the second planetary gear set 12 to the transmission case 2.

The second brake 22 is disposed on the third intermediate wall 2d. The second brake 22 includes a cylinder 23, a piston 24 fitted into the cylinder 23, and an engaging hydraulic pressure chamber 26 defined by the cylinder 23 and the piston 24. When a given engaging hydraulic pressure is supplied to the engaging hydraulic pressure chamber 26, a friction plate of the second brake 22 is engaged and the second brake 22 fixes the ring gear 14r of the fourth planetary gear set 14 to the transmission case 2. In this embodiment, an example of applying the frictional engageable element provided with features of the present invention to the second brake 22 is described. This second brake 22 is described later in detail with reference to FIGS. 3 to 12.

The first to third clutches 31 to 33 are disposed in a counter-engine-side end section inside the transmission case 2. The first to third clutches 31 to 33 are overlapped with each other in the radial directions so that the second clutch 32 is located on the inner circumferential side of the first clutch 31 and the third clutch 33 is located on the inner circumferential side of the second clutch 32 at the same position in the axial directions.

The first clutch 31 disconnects the sun gear 14s of the fourth planetary gear set 14 from the ring gear 13r of the third planetary gear set 13. In other words, the first clutch 31 switches the connection state between the first rotational member 34 coupled to the sun gear 14s and the second rotational member 35 coupled to the ring gear 13r.

The second clutch 32 disconnects the sun gear 14s of the fourth planetary gear set 14 from the integrated rotational element 15 (i.e., the ring gear 12r of the second planetary gear set 12 and the sun gear 13s of the third planetary gear set 13). In other words, the second clutch 32 switches the connection state between the first rotational member 34 coupled to the sun gear 14s and the third rotational member 36 coupled to the integrated rotational element 15.

The third clutch 33 disconnects the sun gear 14s of the fourth planetary gear set 14 from the input shaft 3 and the carrier 12c of the second planetary gear set 12. In other words, the third clutch 33 switches the connection state between the first rotational member 34 coupled to the sun gear 14s and the fourth rotational member 37 coupled to the carrier 12c via the input shaft 3.

The first rotational member 34 is switched in the connection state with the second rotational member 35 by the first clutch 31, switched in the connection state with the third rotational member 36 by the second clutch 32, and switched in the connection state with the fourth rotational member 37 by the third clutch 33. Thus, the first rotational member 34 is commonly used as one of each pair of rotational members of which the connection state is switched by one of the first to third clutches 31 to 33. Therefore, a common rotational member 30 having a wall perpendicular to the axis of the input shaft 3 is disposed near the side wall 2e of the transmission case 2, on the counter-engine side of the first to third clutches 31 to 33. Further, the first rotational member 34 is coupled to the common rotational member 30.

The common rotational member 30 is commonly used by the first to third clutches 31 to 33 and supports cylinders, pistons, hydraulic oil pressure chambers, hydraulic oil paths, centrifugal balance hydraulic pressure chambers, centrifugal balance chamber components, etc. of the first to third clutches 31 to 33. FIG. 1 illustrates pistons 31*p*, 32*p* and 33*p* of the first to third clutches 31 to 33 in a simplified manner. Note that a common member 38 is attached to the second and third clutches 32 and 33 to hold friction plates thereof.

As described above, the automatic transmission 1 of this embodiment includes the transmission mechanism having the first to fourth planetary gear sets 11 to 14, and the first and second brakes 21 and 22 and the first to third clutches 31 to 33 (five frictional engageable elements), and for changing the gear ratio between the input shaft 3 and the output gear 4. FIG. 2 is an engaging combination table of the five frictional engageable elements of the automatic transmission 1. As indicated in the engaging combination table of FIG. 2, three of the five frictional engageable elements are selectively engaged (○marks) to realize first to eighth forward gear ranges and a reverse gear range. In FIG. 2, "CL1," "CL2," and "CL3" indicate the first to third clutches 31 to 33, respectively, and "BR1" and "BR2" indicate the first and second brakes 21 and 22, respectively.

Details of Frictional Engageable Element

Figure 3:
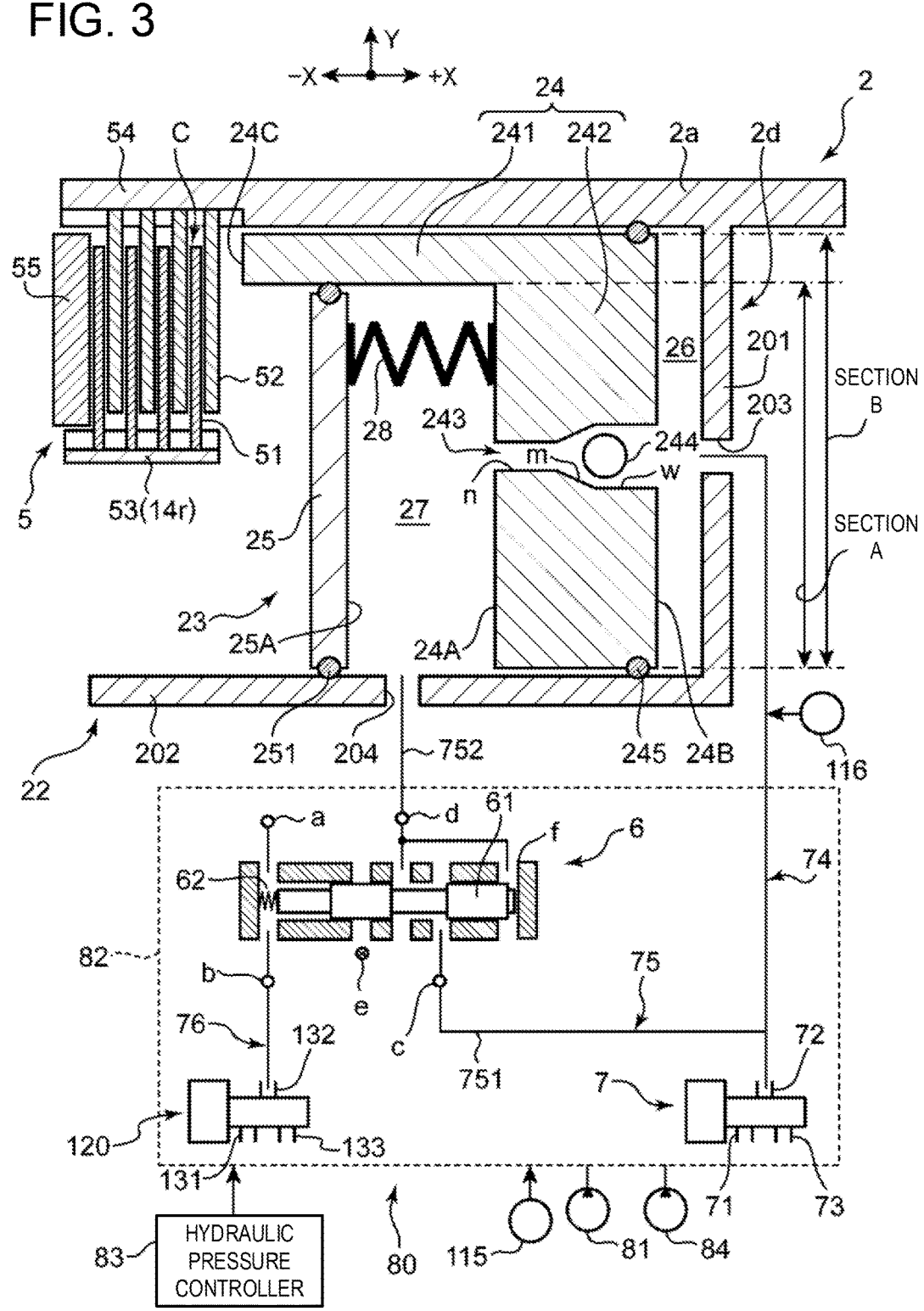
FIG. 3 is a view illustrating a schematic cross section of a structure of a second brake that is one of the frictional engageable elements, and illustrating a configuration of a hydraulic mechanism of the second brake.
Figure 7:
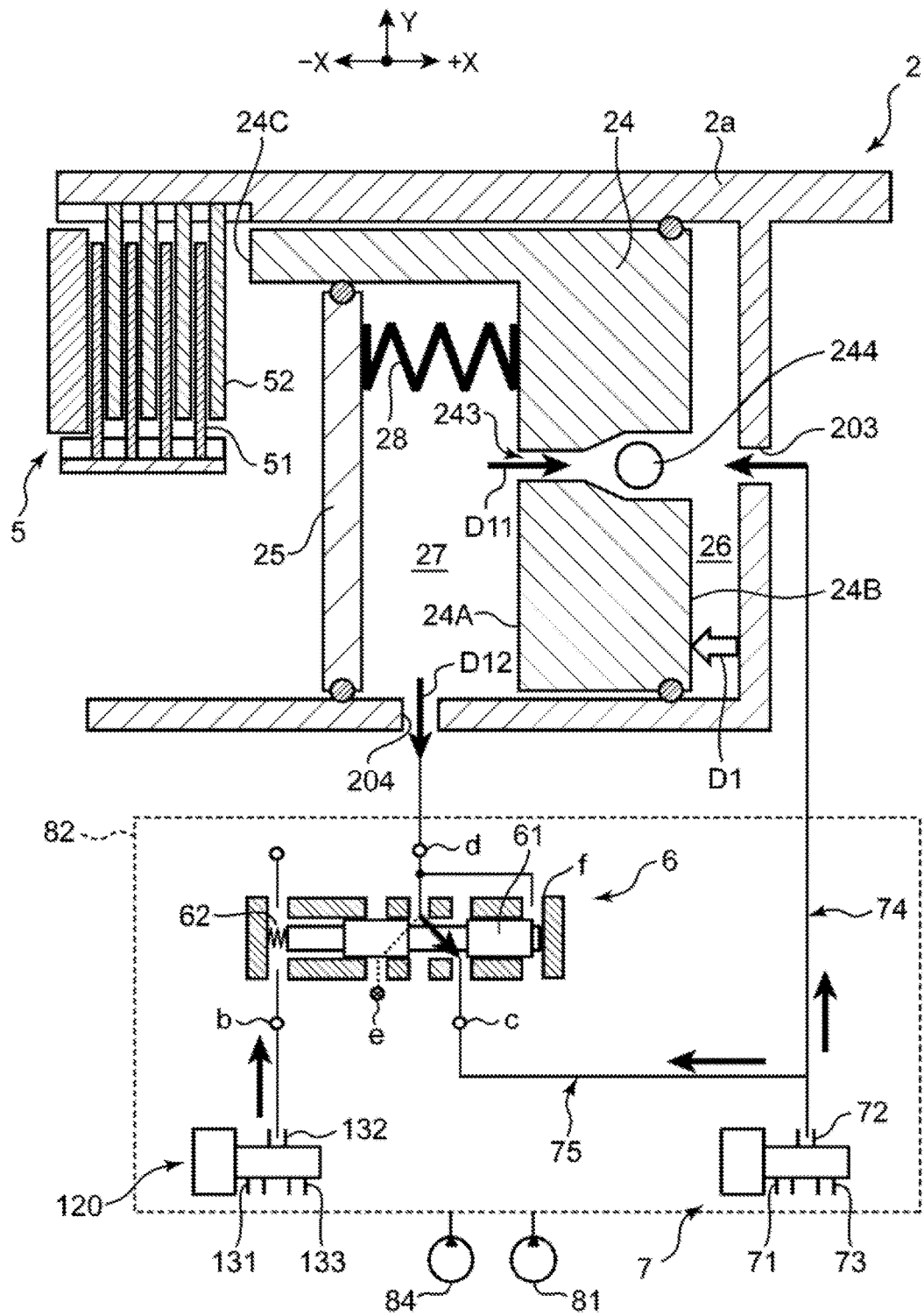
FIG. 7 is a cross-sectional view schematically illustrating the engaging operation of the second brake in a gear shift operation of the automatic transmission.
Figure 8:
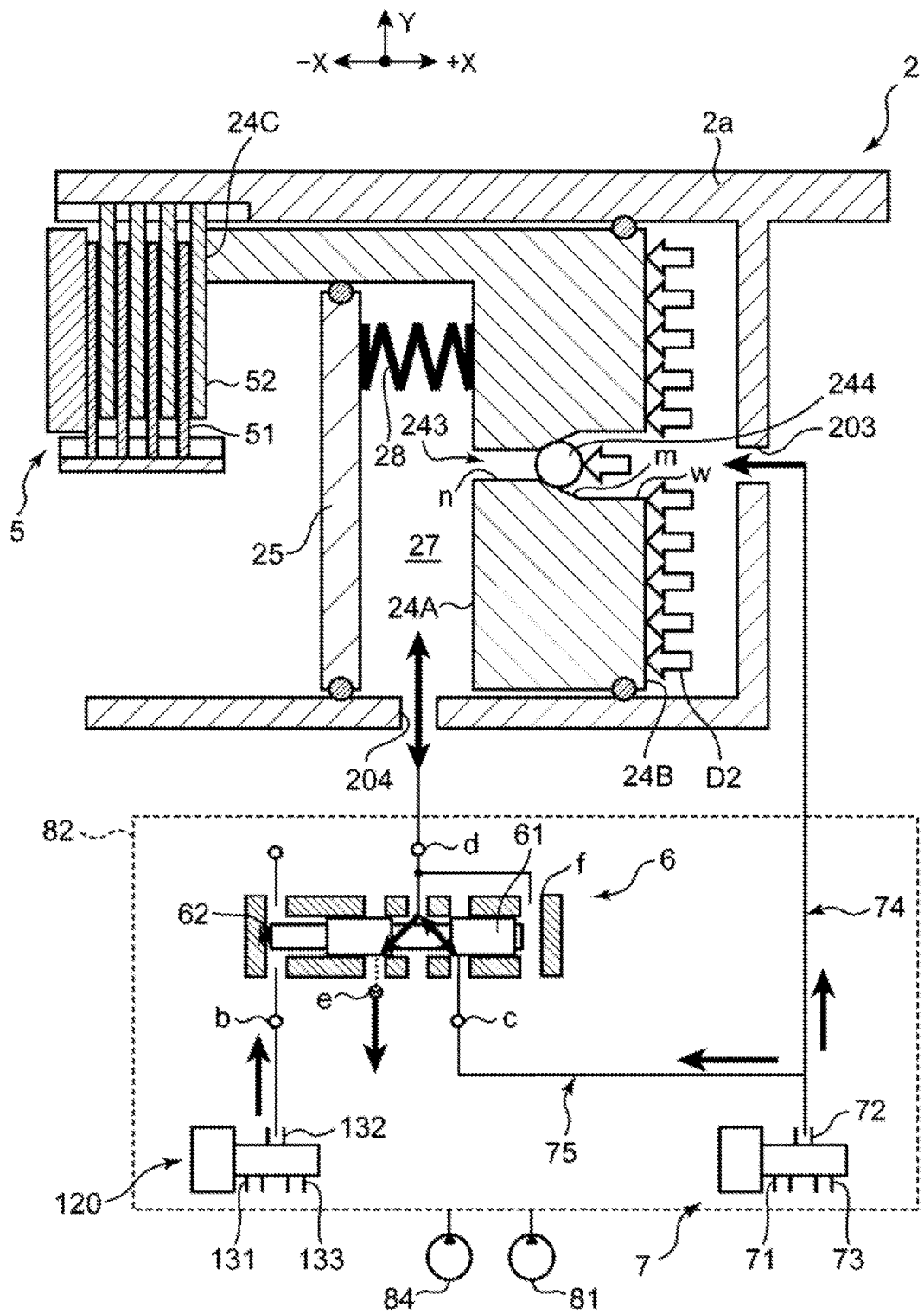
FIG. 8 is a cross-sectional view schematically illustrating the engaging operation of the second brake in the gear shift operation of the automatic transmission.

FIG. 3 is a view illustrating a schematic cross section of a structure of one of the frictional engageable elements of the automatic transmission 1 and illustrating a configuration of a hydraulic mechanism 80 of the frictional engageable element. Here, the second brake 22 is illustrated in FIG. 3. In FIGS. 3, 7, and 8, the axial directions of the input shaft 3 are indicated as X directions and the radial directions of the automatic transmission 1 are indicated as Y directions. Further, for the sake of convenience, the left side of the drawings in the X directions is indicated as the −X direction and the right side of the drawings in the X directions is indicated as the +X direction.

The second brake 22 is disposed in the cylinder 23 formed by the third intermediate wall 2*d* as described above, and includes the piston 24, a sealing ring 25, the engaging hydraulic pressure chamber 26, a disengaging hydraulic pressure chamber 27, a return spring 28, and a friction plate unit 5 (a plurality of friction plates). The hydraulic mechanism 80 is attached to the second brake 22. The hydraulic mechanism 80 includes a mechanical oil pump (hereinafter, referred to as "the MOP") 81, an electric oil pump (hereinafter, referred to as "the EOP") 84, a hydraulic circuit 82, and a hydraulic pressure controller 83 for controlling the MOP 81, the EOP 84, and the hydraulic circuit 82. The hydraulic circuit 82 includes a pressure reducing valve 6, a linear solenoid valve 7 (hydraulic pressure control valve), and a linear solenoid valve 120 (release pressure control valve). Further to the hydraulic circuit 82, an oil temperature sensor 115 is attached. This oil temperature sensor 115 is provided in an oil pan of the automatic transmission 1, for example.

The third intermediate wall 2*d* is formed by a first wall portion 201 extending radially inwardly from the outer circumferential wall 2*a* of the transmission case 2, and a second wall portion 202 extending axially (in the −X direction) from a radially inner edge of the first wall portion 201. The outer circumferential wall 2*a* and the second wall portion 202 oppose to each other in the radial directions with a given gap therebetween. A space formed by the outer circumferential wall 2*a* and the first and second wall portions 201 and 202 is the space of the cylinder 23 for the second brake 22. The first wall portion 201 is formed with a first supply port 203 for supplying hydraulic pressure to the engaging hydraulic pressure chamber 26. The second wall portion 202 is formed with a second supply port 204 for supplying hydraulic pressure to the disengaging hydraulic pressure chamber 27.

The piston 24 has a first surface 24A and a second surface 24B axially opposite from each other, and is axially movable in the space between the outer circumferential wall 2*a* and the second wall portion 202 (inside the cylinder 23). The first surface 24A faces the disengaging hydraulic pressure chamber 27 and the second surface 24B faces the engaging hydraulic pressure chamber 26. The piston 24 moves between a disengaging position at which the friction plate unit 5 is in a disengaged state (e.g., the position illustrated in FIG. 7) and an engaging position at which the piston 24 pushes the friction plate unit 5 to be in an engaged state (the position illustrated in FIG. 8).

The piston 24 includes a pushing piece 241 disposed adjacently to the outer circumferential wall 2*a*, and a pressure receiving piece 242 for sliding on an inner circumferential surface of the outer circumferential wall 2*a* and an outer circumferential surface of the second wall portion 202. The pressure receiving piece 242 is bored a through-hole 243 axially penetrating the pressure receiving piece 242. Further, sealing members 245 are fitted into inner and outer circumferential surfaces of the pressure receiving piece 242.

The pushing piece 241 projects in the −X direction from the pressure receiving piece 242, and includes, at a tip end in a pushing direction (in the −X direction), a tip end surface 24C for applying a pushing force to the friction plate unit 5. The pressure receiving piece 242 is a separator between the engaging hydraulic pressure chamber 26 and the disengaging hydraulic pressure chamber 27. Note that in this embodiment, the engaging hydraulic pressure chamber 26 may be communicated with the disengaging hydraulic pressure chamber 27 by the through-hole 243. The sealing members 245 are for sealing between the inner circumferential surface of the pressure receiving piece 242 and the outer circumferential surface of the second wall portion 202, and sealing between the outer circumferential surface of the pressure receiving piece 242 and the inner circumferential surface of the outer circumferential wall 2*a*, while allowing the axial movement of the piston 24.

The through-hole 243 is a cylindrical hole having different diameters in the axial directions, and has a larger diameter section w, a smaller diameter section n, and an intermediate section m therebetween. The larger diameter section w is formed on the second surface 24B side, i.e., the engaging hydraulic pressure chamber 26 side. The smaller diameter section n is formed on the first surface 24A side, i.e., the disengaging hydraulic pressure chamber 27 side. The intermediate section m is gradually tapered from the larger diameter section w to the smaller diameter section n.

A pressure ball 244 (restricting mechanism) for restricting a flow of hydraulic oil from the engaging hydraulic pressure chamber 26 to the disengaging hydraulic pressure chamber 27 is disposed inside the through-hole 243. A diameter of the pressure ball 244 is smaller than a diameter of the larger diameter section w and larger than a diameter of the smaller diameter section n. When the hydraulic pressure of the disengaging hydraulic pressure chamber 27 is higher than that of the engaging hydraulic pressure chamber 26, the pressure ball 244 floats within the larger diameter section w and does not restrict the flow of the hydraulic oil between the engaging hydraulic pressure chamber 26 and the disengaging hydraulic pressure chamber 27.

On the other hand, when the hydraulic pressure inside the engaging hydraulic pressure chamber 26 is higher than that of the disengaging hydraulic pressure chamber 27, the pressure ball 244 is stopped at the intermediate section m to block the through-hole 243, and restricts the flow of the hydraulic oil between the engaging hydraulic pressure chamber 26 and the disengaging hydraulic pressure chamber 27.

The sealing ring 25 is a flat plate member having an annular shape and disposed on the first surface 24A side of the piston 24 to oppose to the pressure receiving piece 242. The sealing ring 25 is disposed between the pushing piece 241 of the piston 24 and the second wall portion 202, and forms the disengaging hydraulic pressure chamber 27 together with the pushing piece 241 of the piston 24 and the second wall portion 202. Sealing members 251 are attached to inner and outer circumferential surfaces of the sealing ring 25. The sealing members 251 are for sealing between an outer circumferential edge of the sealing ring 25 and an inner circumferential surface of the pushing piece 241 and sealing between an inner circumferential edge of the sealing ring 25 and the outer circumferential surface of the second wall portion 202.

The engaging hydraulic pressure chamber 26 is space where hydraulic pressure for moving the piston 24 to the engaging position (in the −X direction) is supplied. The engaging hydraulic pressure chamber 26 is defined by the first and second wall portions 201 and 202, the outer circumferential wall 2a, and the second surface 24B of the piston 24. In other words, the engaging hydraulic pressure chamber 26 hydraulically applies the second surface 24B a pushing force to move the piston 24 to the engaging position at which the friction plate unit 5 is pushed to reach the engaged state (friction plates are engaged with each other).

The disengaging hydraulic pressure chamber 27 is space where hydraulic pressure for moving the piston 24 to the disengaging position (in the +X direction) is supplied. The disengaging hydraulic pressure chamber 27 is defined by the second wall portion 202, the pushing piece 241 of the piston 24, a +X-side surface 25A of the sealing ring 25, and the first surface 24A of the piston 24. In other words, the disengaging hydraulic pressure chamber 27 hydraulically applies the first surface 24A the pushing force to move the piston 24 to the disengaging position at which the friction plate unit 5 is pushed to reach the disengaged state. The return spring 28 for elastically biasing the piston in the +X direction is disposed inside this disengaging hydraulic pressure chamber 27. When hydraulic pressure is not supplied to the engaging hydraulic pressure chamber 26, the return spring 28 moves (returns) the piston 24 in the +X direction.

Here, a pressure receiving area of the second surface 24B is set larger than that of the first surface 24A. Hereinafter, a section of the first surface 24A to which hydraulic pressure is applied from the disengaging hydraulic pressure chamber 27, i.e., the pressure receiving section of the first surface 24A, is referred to as the section A (schematically indicated as "SECTION A" in FIG. 3). Further, a section of the second surface 24B to which hydraulic pressure is applied from the engaging hydraulic pressure chamber 26, i.e., the pressure receiving section of the second surface 24B, is referred to as the section B (schematically indicated as "SECTION B" in FIG. 3). In this embodiment, when the pressure receiving area of the section A is $S_A$ and the pressure receiving area of the section B is $S_B$, a relationship of $S_B > S_A$ is satisfied.

Such a difference in pressure receiving area between the sections A and B allows the piston 24 to move based on the difference. For example, if the engaging hydraulic pressure chamber 26 and the disengaging hydraulic pressure chamber 27 are supplied the same level of hydraulic pressure, the hydraulic pressure is received at the first and second surfaces 24A and 24B. In this case, since the pressure receiving area of the second surface 24B is larger than the pressure receiving area of the first surface 24A, a pushing force in the −X direction, corresponding to the pressure receiving area difference, acts on the piston 24.

Since the piston 24 is bored the through-hole 243, upon the action of the pushing force in the −X direction, the hydraulic oil inside the disengaging hydraulic pressure chamber 27 flows into the engaging hydraulic pressure chamber 26 through the through-hole 243. Thus, the piston 24 moves in the −X direction even when the same level of hydraulic pressure is supplied to the engaging hydraulic pressure chamber 26 and the disengaging hydraulic pressure chamber 27 at the same time. In other words, even if the hydraulic pressures in the engaging hydraulic pressure chamber 26 and the disengaging hydraulic pressure chamber 27 are even, the piston 24 is moved in the −X direction by the pushing force corresponding to the pressure receiving area difference.

The friction plate unit 5 includes a plurality of friction plates disposed by leaving clearances therebetween and is disposed on the first surface 24A side of the piston 24. For example, the friction plate unit 5 is comprised of a plurality of drive plates 51 and a plurality of driven plates 52 that are alternately arranged by leaving a given clearance C. Facings are adhered to both surfaces of each drive plate 51. The drive plates 51 are spline coupled to a first spline part 53, and the driven plates 52 are spline coupled to a second spline part 54. The first spline part 53 corresponds to an outer circumferential part of the ring gear 14r of the fourth planetary gear set 14 illustrated in FIG. 1. The second spline part 54 is provided to a part of the outer circumferential wall 2a of the transmission case 2.

The tip end surface 24C of the piston 24 contacts with one of the driven plates 52 that is located on the most +X side and applies the pushing force to the friction plate unit 5. A retaining plate 55 is disposed adjacently to one of the drive plates 51 that is located on the most −X side. The retaining plate 55 restricts movements of the drive plates 51 and the driven plates 52 in the −X direction.

The hydraulic mechanism 80 supplies and discharges a given level of hydraulic pressure to and from the frictional engageable element (the second brake 22 in FIG. 3) of the automatic transmission 1. The MOP 81 of the hydraulic mechanism 80 uses the engine as its drive source, flows hydraulic oil to required sections, and generates and supplies a given hydraulic pressure. The EOP 84 is a hydraulic pressure supply device for supplying hydraulic pressure to the hydraulic circuit 82 in an automatic stop of the engine. The EOP 84 uses, as its drive source, a motor that is driven by receiving electric power from a battery, and circulates hydraulic oil to particular sections, and generates and supplies a given level of hydraulic pressure.

The hydraulic circuit 82 is provided to each of the first and second brakes 21 and 22 and the first to third clutches 31 to 33 (frictional engageable elements), and selectively supplies hydraulic pressure to the frictional engageable elements to realize the respective gear ranges illustrated in FIG. 2. Regarding the hydraulic circuit 82, FIG. 3 only illustrates the pressure reducing valve 6, the linear solenoid valve 7, and the linear solenoid valve 120 which perform the supply and discharge of the hydraulic pressure to and from the second brake 22.

The linear solenoid valve 7 is a hydraulic pressure control valve for supplying and discharging hydraulic pressure to and from each of the engaging hydraulic pressure chamber 26 and the disengaging hydraulic pressure chamber 27. The linear solenoid valve 7 includes an input port 71 for receiving hydraulic oil from the MOP 81 and the EOP 84, an output port 72 for outputting the hydraulic oil (hydraulic pressure), a drain port 73 for discharging the hydraulic oil, and a spool (not illustrated) which operates in response to a power distribution to a coil thereof. The operation of the spool causes the input and output ports 71 and 72 to communicate with each other when supplying the hydraulic pressure to the engaging hydraulic pressure chamber 26 and the disengaging hydraulic pressure chamber 27, and causes the output port 72 and the drain port 73 to communicate with each other when discharging the hydraulic pressure. The linear solenoid valve 7 adjusts an amount of oil discharged from the output port 72 based on a control of the power distribution amount to the coil.

The hydraulic circuit 82 includes a first oil path 74 for communicating the linear solenoid valve 7 with the engaging hydraulic pressure chamber 26, and a second oil path 75 for communicating the linear solenoid valve 7 with the disengaging hydraulic pressure chamber 27. For example, an upstream end of the first oil path 74 is connected to the output port 72 and a downstream end of the first oil path 74 is connected to the first supply port 203 communicating with the engaging hydraulic pressure chamber 26. An upstream end of the second oil path 75 is connected to the output port 72 and a downstream end of the second oil path 75 is connected to the second supply port 204 communicating with the disengaging hydraulic pressure chamber 27. Thus, both of the first and second oil paths 74 and 75 receive the oil from the same output port 72 of the linear solenoid valve 7 instead of receiving it through different hydraulic supply paths.

Note that a hydraulic pressure sensor 116 for detecting pressure of the hydraulic oil (hydraulic pressure) is attached to the first oil path 74. Thus, actual pressure of the hydraulic oil inside the first oil path 74 is measured by this hydraulic pressure sensor 116.

The second oil path 75 is divided into an upstream oil path 751 and a downstream oil path 752 by the pressure reducing valve 6. When causing the friction plate unit 5 to change from the disengaged state to the engaged state, hydraulic pressure is supplied to the engaging hydraulic pressure chamber 26 and the disengaging hydraulic pressure chamber 27 simultaneously from the output port 72 of the linear solenoid valve 7 through the first and second oil paths 74 and 75.

The pressure reducing valve 6 is built in the second oil path 75 and adjusts the hydraulic pressure of the disengaging hydraulic pressure chamber 27 to be at or below a given value (a set pressure of the pressure reducing valve 6). The pressure reducing valve 6 includes a plurality of ports a, b, c, d, e and f, and a spool 61 for switching ports among the plurality of ports. The ports "a" and "b" communicate with a spring chamber accommodating a return spring 62 for elastically biasing the spool 61 in the +X direction. The port "c" is an input port and the port "d" is an output port. The input port c is connected to a downstream end of the upstream oil path 751 of the second oil path 75. The output port d is connected to an upstream end of the downstream oil path 752, and thus the output port d is connected with the second supply port 204.

The port "e" is a drain port and the port "f" is a feedback port. When the biasing force of the return spring 62 is superior to (higher than) hydraulic pressure supplied to the feedback port f, the input and output ports c and d communicate with each other. Thus, the upstream and downstream oil paths 751 and 752 communicate with each other, which allows the hydraulic pressure to be supplied to the disengaging hydraulic pressure chamber 27.

On the other hand, when hydraulic pressure that overtakes the biasing force of the return spring 26 is supplied to the feedback port f, the hydraulic pressure moves the spool 61 in the −X direction and the output port d and the drain port e communicate with each other, which allows the hydraulic pressure to be discharged from the disengaging hydraulic pressure chamber 27. In other words, when the hydraulic pressure of the disengaging hydraulic pressure chamber 27 becomes high, the hydraulic pressure supplied to the pressure reducing valve 6 from the feedback port f also becomes high, the spool 61 is operated to communicate the output port d with the drain port e, and the disengaging hydraulic pressure chamber 27 is depressurized. When the biasing force of the return spring 62 becomes superior accordingly, the spool 61 resumes to communicate the input port c with the output port d, which allows the hydraulic pressure to be supplied to the disengaging hydraulic pressure chamber 27.

The linear solenoid valve 120 is a hydraulic pressure control valve connected to the port b of the pressure reducing valve 6 via a third oil path 76, and supplies and discharges hydraulic pressure to and from the spring chamber. Thus, the linear solenoid valve 120 functions as a set pressure (release pressure) control valve for changing a set pressure (release pressure) of the pressure reducing valve 6.

The linear solenoid valve 120 includes an input port 131 into which hydraulic oil is introduced from the MOP 81 and the EOP 84, an output port 132 for outputting hydraulic oil (hydraulic pressure), a drain port 133 for discharging hydraulic oil, and a spool (not illustrated) which operates in response to a power distribution to a coil. The operation of the spool causes the input and output ports 131 and 132 to communicate with each other when supplying the hydraulic pressure to the spring chamber of the pressure reducing valve 6, and causes the output port 132 and the drain port 133 to communicate with each other when discharging the hydraulic pressure. The linear solenoid valve 120 adjusts an amount of oil discharged from the output port 132 based on a control of the power distribution amount to the coil.

The hydraulic pressure controller 83 controls the hydraulic pressures supplied to the engaging hydraulic pressure chamber 26 and the disengaging hydraulic pressure chamber 27 and also the hydraulic pressure inside the spring chamber of the pressure reducing valve 6 by controlling the operations of the solenoids of the linear solenoid valves 7 and 120. The hydraulic pressure controller 83 also controls the linear solenoid valves connected to the other frictional engageable elements, and thus controls hydraulic pressures supplied to the first brake 21 and the first to third clutches 31 to 33.

MOP 81 and EOP 84 of Hydraulic Mechanism 80

A hydraulic system of the hydraulic mechanism 80 including the MOP 81 and the EOP 84 is described with reference to FIG. 4 which is a schematic view illustrating the hydraulic system for supplying hydraulic pressure to the hydraulic circuit 82.

Figure 4:
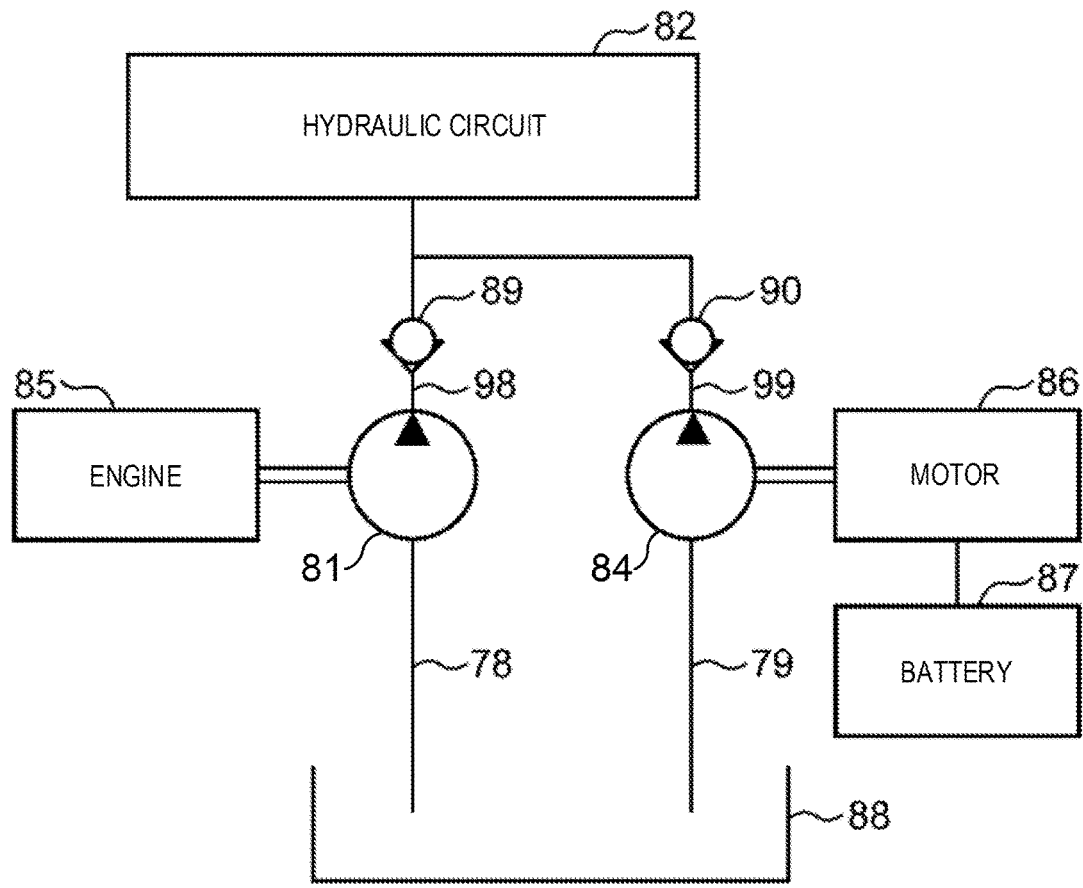
FIG. 4 is a schematic view illustrating a hydraulic system for supplying hydraulic pressure to a hydraulic circuit.

As illustrated in FIG. 4, in the hydraulic mechanism 80 of this embodiment, the MOP 81 and the EOP 84 are connected to the hydraulic circuit 82. As described above, the MOP 81 is a pump for supplying hydraulic pressure by using the engine 85 as the drive source, and the EOP 84 is a device as one example of the hydraulic pressure supply device, using the motor 86 as the drive source and for supplying hydraulic pressure. The motor 86 is driven by receiving electric power from the battery 87.

The hydraulic oil is introduced from the oil pan 88 to the MOP 81 and the EOP 84 via oil paths 78 and 79, respectively. The MOP 81 is connected to the hydraulic circuit 82 by an oil path 98, and a check valve 89 is provided between the MOP 81 and the hydraulic circuit 82. The check valve 89 is provided to prevent a backflow of hydraulic oil from the hydraulic circuit 82 to the MOP 81 side while the MOP 81 is stopped.

The EOP 84 is connected to the hydraulic circuit 82 by an oil path 99, and a check valve 90 is provided between the EOP 84 and the hydraulic circuit 82. The check valve 90 is also provided to prevent a backflow of hydraulic oil from the hydraulic circuit 82 to the EOP 84 side while the EOP 84 is stopped.

The automatic transmission 1 of this embodiment is mounted on a vehicle having an automatic engine stop mechanism (idle stop mechanism) for automatically stopping the engine 85 when a given automatic stop condition is satisfied, and automatically starting the engine 85 when a given restart condition is satisfied after the engine 85 is automatically stopped. The EOP 84 is provided to supply hydraulic pressure to the hydraulic circuit 82 while the engine 85 is automatically stopped.

By providing the EOP 84 in addition to the MOP 81, the engaged state of the frictional engageable element (here, the second brake 22) is maintained even while the engine 85 is automatically stopped, and a shock caused in the vehicle (vehicle shock) in the engine restart is reduced.

Control System Configuration of Automatic Transmission 1

Figure 5:
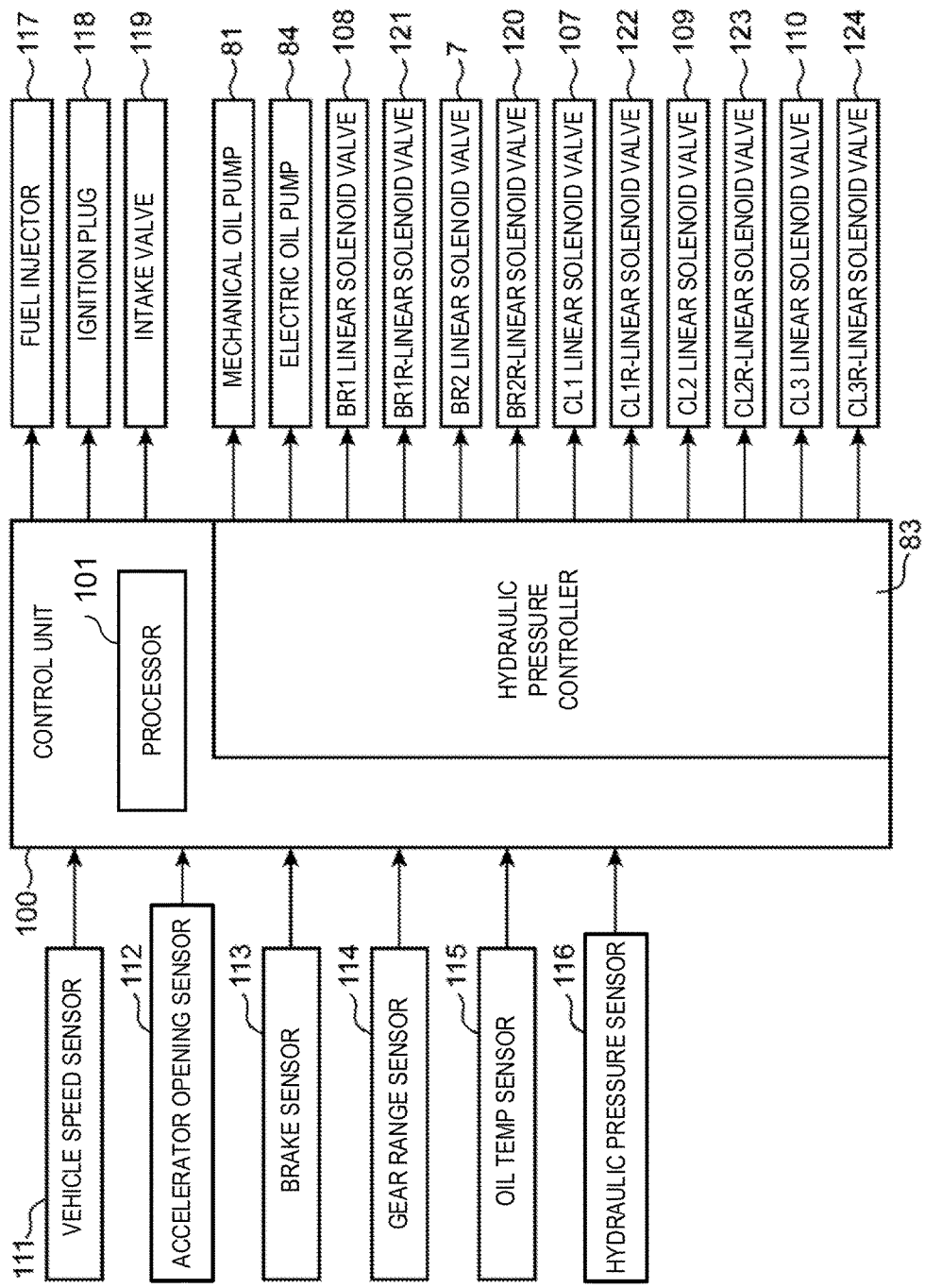
FIG. 5 is a block diagram schematically illustrating a control system configuration of the automatic transmission of the embodiment.

A control system configuration of the automatic transmission 1 of this embodiment is described with reference to FIG. 5 which is a block diagram schematically illustrating the control system configuration of the automatic transmission 1 of this embodiment. In FIG. 5, a linear solenoid valve connected to an engaging hydraulic pressure chamber and a disengaging hydraulic pressure chamber of the first brake 21 is indicated as "BR1 LINEAR SOLENOID VALVE 108."

Similarly, the linear solenoid valve connected to the engaging hydraulic pressure chamber and the disengaging hydraulic pressure chamber of the second brake 22 is indicated as "BR2 LINEAR SOLENOID VALVE 7," a linear solenoid valve connected to an engaging hydraulic pressure chamber and a disengaging hydraulic pressure chamber of the first clutch 31 is indicated as "CL1 LINEAR SOLENOID VALVE 107," a linear solenoid valve connected to an engaging hydraulic pressure chamber and a disengaging hydraulic pressure chamber of the second clutch 32 is indicated as "CL2 LINEAR SOLENOID VALVE 109," and a linear solenoid valve connected to an engaging hydraulic pressure chamber and a disengaging hydraulic pressure chamber of the third clutch 33 is indicated as "CL3 LINEAR SOLENOID VALVE 110."

Further, a linear solenoid valve connected to a pressure reducing valve of the first brake 21 is indicated as "BR1R-LINEAR SOLENOID VALVE 121," the linear solenoid valve connected to the pressure reducing valve 6 of the second brake 22 is indicated as "BR2R-LINEAR SOLENOID VALVE 120," a linear solenoid valve connected to a pressure reducing valve of the first clutch 31 is indicated as "CL1R-LINEAR SOLENOID VALVE 122," a linear solenoid valve connected to a pressure reducing valve of the second clutch 32 is indicated as "CL2R-LINEAR SOLENOID VALVE 123," and a linear solenoid valve connected to a pressure reducing valve of the third clutch 33 is indicated as "CL3R-LINEAR SOLENOID VALVE 124."

As illustrated in FIG. 5, a control unit 100 that is the control device of the vehicle in this embodiment receives various information from the vehicle, such as vehicle speed information detected by a vehicle speed sensor 111, accelerator opening information detected by an accelerator opening sensor 112, brake information detected by a brake sensor 113, gear range (gear shift) information detected by a gear range sensor 114, oil temperature information detected by an oil temperature sensor 115, and the actual pressure (measured hydraulic pressure) information detected by the hydraulic pressure sensor 116.

The control unit 100 performs calculations based on the received various information and transmits control signals to a fuel injector 117, an ignition plug 118, and an intake valve 119. The control unit 100 includes the hydraulic pressure controller 83 and a processor configured to execute instructions to send and receive signals, and the hydraulic pressure controller 83 outputs control signals to the MOP (mechanical oil pump) 81, the EOP (electric oil pump) 84, the BR1 linear solenoid valve 108, the BR2 linear solenoid valve 7, the CL1 linear solenoid valve 107, the CL2 linear solenoid valve 109, and the CL3 linear solenoid valve 110 of the hydraulic mechanism 80. The hydraulic pressure controller 83 may have a separate processor or may utilize the processor 101 as an integrated part of the control unit 100.

Further, the hydraulic pressure controller 83 outputs control signals to the BR1R-linear solenoid valve 121, the BR2R-linear solenoid valve 120, the CL1R-linear solenoid valve 122, the CL2R-linear solenoid valve 123, and the CL3R-linear solenoid valve 124.

Note that the control unit 100 stores a given gear shift map (not illustrated). The gear shift map has the vehicle speed and the accelerator opening as parameters and is designed to have a plurality of ranges for obtaining a suitable gear range according to these vehicle speed and accelerator opening.

Hydraulic Pressure Control in Engaging Operation Executed by Control Unit 100

A hydraulic pressure control in the engaging operation of executed by the control unit 100 is described with reference to FIG. 6 which is a time chart of the hydraulic pressure control executed by the hydraulic pressure controller 83 of the control unit 100 to engage the second brake 22 of the automatic transmission 1.

First, the control unit 100 reads various signals before a timing T0. The read signals include the vehicle speed information, the accelerator opening information, the brake information, the gear range (gear shift) information, the oil temperature information, and the hydraulic pressure information. Here, the hydraulic pressure controller 83 instructs the linear solenoid valve 7 to maintain the hydraulic pressure (engaging pressure) at a hydraulic pressure level L0, in other words, maintain the disengaged state. This state corresponds to a state in which the engaging hydraulic pressure chamber 26 illustrated in FIG. 3 has little volume.

Next, when the control unit 100 receives a gear shift command, the hydraulic pressure controller 83 instructs the linear solenoid valve 7 to increase the engaging pressure to a hydraulic pressure level L4. Note that here, the linear solenoid valve 120 is instructed to set the set pressure (release pressure) of the pressure reducing valve 6 to a hydraulic pressure level L5.

The release pressure of the pressure reducing valve is generally defined by adding a pushing force based on the pressure of the hydraulic oil charged into the spring chamber, to the biasing force of the return spring 62. However, in this embodiment and other embodiment and modifications, for the sake of convenience, the release pressure of the pressure reducing valve is defined by the pressure of the hydraulic oil charged into the spring chamber without taking the biasing force of the return spring 62 into consideration.

Until a timing T5, the hydraulic pressure controller 83 instructs the linear solenoid valve 7 to maintain the engaging pressure at the hydraulic pressure level L4, and instructs the linear solenoid valve 120 to maintain the release pressure of the pressure reducing valve 6 to the hydraulic pressure level L5. In the period from the timing T0 to the timing T5, hydraulic pressure of the hydraulic pressure level L4 which is lower than the hydraulic pressure level L5 is supplied to the engaging hydraulic pressure chamber 26 and the disengaging hydraulic pressure chamber 27. The period from the timing T0 to the timing T5 is referred to as the first period. In the first period, since the pressure limiting operation (pressure reducing operation) of the pressure reducing valve 6 is not performed, the engaging hydraulic pressure chamber 26 and the disengaging hydraulic pressure chamber 27 are in the same pressure state.

Figure 6:
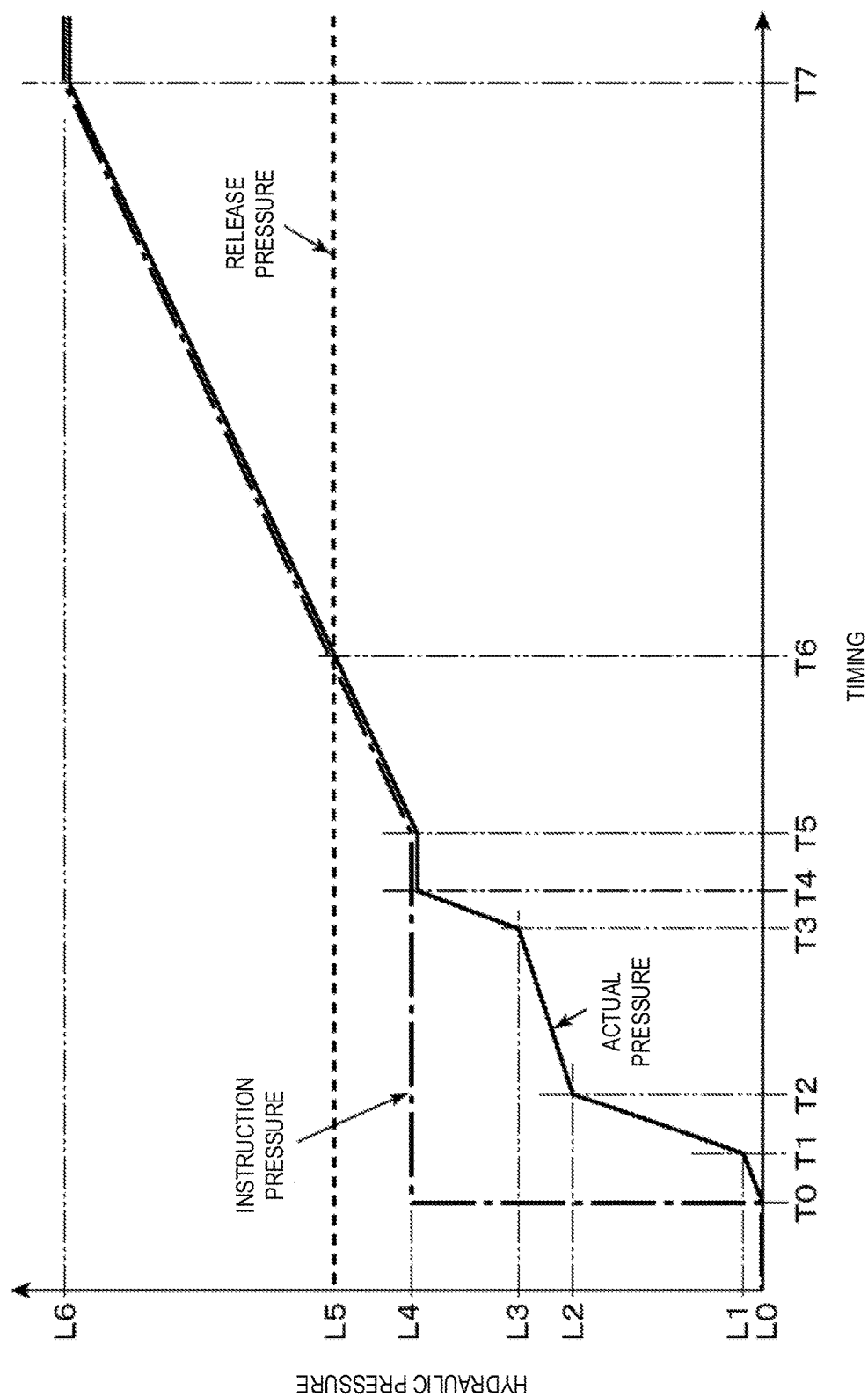
FIG. 6 is a time chart of a hydraulic pressure control executed by a hydraulic pressure controller to engage the second brake of the automatic transmission.

Note that as illustrated in FIG. 6, the actual engaging pressures in the oil paths 74 and 75 extending to the frictional engageable element gradually increase to a hydraulic pressure level L1 from the timing T0 to a timing T1, and increase to a hydraulic pressure level L2 at a sharper inclination from the timing T1 to a timing T2. Then the actual engaging pressures gradually increase to a hydraulic pressure level L3 from the timing T2 to a timing T3, and then increase to the hydraulic pressure level L4 at a sharper inclination from the timing T3 to a timing T4. From the timing T4 to the timing T5, the actual engaging pressure is kept at the hydraulic pressure level L4 which is substantially the same as the instruction pressure.

Next, at the timing T5, the hydraulic pressure controller 83 instructs the linear solenoid valve 7 to increase the engaging pressure to a hydraulic pressure level L6. Note that as illustrated in FIG. 6, the pressure increase from the timing T5 is performed gradually from the hydraulic pressure level L4 at the timing T5 to the hydraulic pressure level L6 at a timing T7, i.e., at a positive inclination. During the pressure increase (at a timing T6), the instruction engaging pressure and the actual engaging pressure exceed the release pressure level L5 of the pressure reducing valve 6. Thus, the pressure limiting operation (depressurizing operation) of the pressure reducing valve 6 is started and a pressure difference is produced between the engaging hydraulic pressure chamber and the disengaging hydraulic pressure chamber, which is described later in detail.

At the timing T7, the hydraulic pressure controller 83 instructs the linear solenoid valve 7 to maintain the engaging pressure at the hydraulic pressure level L6.

Note that as illustrated in FIG. 6, the instruction engaging pressure from the hydraulic pressure controller 83 to the linear solenoid valve 7 increases with time from the hydraulic pressure level L4 at the timing T5 to the hydraulic pressure level L6 at the timing T7. This increase of the instruction pressure is achieved by a program stored beforehand in the hydraulic pressure controller 83.

As further illustrated in FIG. 6, the pressure increase from the timing T5 to the timing T7 is performed in a manner that the actual engaging pressure substantially matches with the instruction engaging pressure.

In this embodiment, the instruction engaging pressure from the hydraulic pressure controller 83 is kept at the hydraulic pressure level L4 in the first period, and increased from the hydraulic pressure level L5 to the hydraulic pressure level L7 in a second period from the timing T5 to the timing T7.

Thus, the engaging operation of the automatic transmission 1 of this embodiment completes.

Details of Engaging Operation

The engaging operation of the frictional engageable element is described in detail with reference to FIGS. 7 and 8 which illustrate the engaging operation of the second brake 22 as an example.

The state of the second brake 22 illustrated in FIG. 7 indicates the state from the timing T0 to the timing T5 (first period) in FIG. 6.

As described above, in this embodiment, the release pressure of the pressure reducing valve 6 is kept at the hydraulic pressure level L5 in a normal state. For example, hydraulic pressure supplied to the input port 131 of the linear solenoid valve 120 is further supplied from the output port 132 to the spring chamber of the pressure reducing valve 6 via the third oil path 76.

Further, when the hydraulic pressure controller 83 instructs the linear solenoid valve 7 to increase the engaging pressure to the hydraulic pressure level L4 at the timing T0, as indicated by the thick arrows at the first and second oil paths 74 and 75, the hydraulic oil is started to flow into the engaging hydraulic pressure chamber 26 and the disengaging hydraulic pressure chamber 27. For example, the hydraulic pressure controller 83 controls the input and output ports 71 and 72 of the linear solenoid valve 7 to communicate with each other so that the hydraulic oil discharged from the MOP 81 flows through the first and second oil paths 74 and 75. Here, the pressure reducing valve 6 is in the state where the input port c is communicated with the output port d, because the hydraulic pressure level L4 is set lower than the hydraulic pressure level L5 which is the release pressure of the pressure reducing valve 6 as described above.

Further, the hydraulic oil is started to flow from the common output port 72 of the linear solenoid valve 7 into the engaging hydraulic pressure chamber 26 through the first oil path 74, and at the same time, into the disengaging hydraulic pressure chamber 27 through the upstream oil path 751 of the second oil path 75, the pressure reducing valve 6, and the downstream oil path 752.

Then the engaging hydraulic pressure chamber 26 and the disengaging hydraulic pressure chamber 27 are filled with the hydraulic oil, and the piston 24 starts to move in the −X direction. As illustrated in FIG. 7, also when the same level of hydraulic pressure is supplied to the engaging hydraulic pressure chamber 26 and the disengaging hydraulic pressure chamber 27, the piston 24 moves based on the pressure receiving area difference between the first and second surfaces 24A and 24B. Since the pressure receiving area of the second surface 24B of the piston 24 is larger than that of the first surface 24A as described above, a pushing force D1 acts on the piston 24 in the −X direction according to the pressure receiving area difference. In other words, when the hydraulic pressures of the engaging hydraulic pressure chamber 26 and the disengaging hydraulic pressure chamber 27 in this state are $P_{(L4)}$, the pressure receiving area of the section A is $S_A$, and the pressure receiving area of the section B is $S_B$, the pushing force D1 is defined by the following equation.

$$D1 = P_{(L4)} \times (S_B - S_A) \quad (1)$$

Thus, the piston 24 is moved in the −X direction by the pushing force D1. Note that since the pushing force D1 needs to overtake the biasing force of the return spring 28 in +X direction, the pressure receiving area difference ($S_B$−$S_A$) is set in consideration of the spring constant of the return spring 28.

When the piston 24 moves in the −X direction, the hydraulic pressure inside the disengaging hydraulic pressure chamber 27 increases. Since the piston 24 is in an early stage of the process of moving in the −X direction, the volume of the disengaging hydraulic pressure chamber 27 is relatively large and contains a large amount of hydraulic oil. Therefore, as indicated by the arrow D11 of FIG. 7, the hydraulic oil in the disengaging hydraulic pressure chamber 27 flows into the engaging hydraulic pressure chamber 26 through the through-hole 243 according to the movement of the piston 24 in the −X direction. Thus, the balance in the hydraulic pressure between the engaging hydraulic pressure chamber 26 and the disengaging hydraulic pressure chamber 27 is substantially maintained.

Note that as indicated by the arrow D12, hydraulic oil may reverse back into the second oil path 75 depending on the level of hydraulic pressure inside the disengaging hydraulic pressure chamber 27.

Further, since the release pressure of the pressure reducing valve 6 is the hydraulic pressure level L5 which is higher than the hydraulic pressure level L4 supplied to the engaging hydraulic pressure chamber 26 and the disengaging hydraulic pressure chamber 27, the input port c and the output port d of the pressure reducing valve 6 remain communicated.

Since the engaging hydraulic pressure chamber 26 receives the hydraulic oil from the disengaging hydraulic pressure chamber 27 as described above, only a small amount of hydraulic oil is required to be supplied to the engaging hydraulic pressure chamber 26 through the first oil path 74. In other words, only the hydraulic oil at the flow rate high enough to produce the pushing force D1 based on the pressure receiving area difference is required to be supplied through the linear solenoid valve 7. Therefore, high hydraulic responsiveness is obtained in moving the piston 24 in the −X direction. As the piston 24 moves, the tip end surface 24C approaches the friction plate unit 5 and the return spring 28 is gradually compressed.

In the state from the timing T5 to the timing T6, the piston 24 moves in the −X direction and the tip end surface 24C is located at the position (engaging position) contacting with the friction plate unit 5 (driven plate 52), i.e., the zero touch state for friction plates 51, 52. Even in the period from the timing T5 to the timing T6, only the pushing force D1 based on the pressure receiving area difference ($S_B$−$S_A$) acts on the second surface 24B and the flows of oil indicated by the arrows D11 and D12 occur, same for the state of FIG. 7.

As the tip end surface 24C contacts with the friction plate unit 5 and the piston 24 pushes the friction plate unit 5, the clearance between the drive plates 51 and the driven plates 52 is closed and eventually frictional engaging force is produced between the plates 51 and 52. Also at this point, only the pushing force D1 described above contributes in the pushing. Therefore, the drive plates 51 and the driven plates 52 are engaged by a little engaging pressure in the early stage of the engagement, which contributes in reducing the vehicle shock.

The state of the second brake 22 illustrated in FIG. 8 indicates the state after the timing T6 in the second period, and the friction plate unit 5 is engaged at a given engaging pressure. In this state, the hydraulic pressure controller 83 controls the linear solenoid valve 7 to discharge a given engaging hydraulic pressure (line pressure) from the output port 72. Thus, the engaging hydraulic pressure is suppliable to the engaging hydraulic pressure chamber 26 and the disengaging hydraulic pressure chamber 27 through the first and second oil paths 74 and 75.

Here, once the actual engaging pressure reaches the hydraulic pressure level L5 which is the release pressure of the pressure reducing valve 6, the pressure reducing valve 6 starts the pressure limiting operation (pressure reducing operation) to adjust the hydraulic pressure of the disengaging hydraulic pressure chamber 27 to fall below a given pressure (lower than the hydraulic pressure of the engaging hydraulic pressure chamber 26). For example, when the hydraulic pressure of the disengaging hydraulic pressure chamber 27 increases and the feedback port f of the pressure reducing valve 6 receives higher hydraulic pressure than the release pressure (hydraulic pressure level L5), the spool 61 is moved in the −X direction by the hydraulic pressure and the output port d communicates with the drain port e. Therefore, the hydraulic pressure of the disengaging hydraulic pressure chamber 27 is maintained below the certain pressure. Thus, only the engaging hydraulic pressure chamber 26 is pressurized.

By having the pressure inside the engaging hydraulic pressure chamber 26 higher than that inside the disengaging hydraulic pressure chamber 27, the pressure ball 244 moves in the −X direction and blocks the through-hole 243. Therefore, the movements of the hydraulic oil in both directions between the engaging hydraulic pressure chamber 26 and the disengaging hydraulic pressure chamber 27 are restricted. Thus, a large pushing force D2 acts on the piston 24 in the −X direction according to the difference between the engaging hydraulic pressure (the hydraulic pressure of the engaging hydraulic pressure chamber 26) and the disengaging hydraulic pressure (the hydraulic pressure of the disengaging hydraulic pressure chamber 27) and to the pressure receiving area difference. For example, when the hydraulic pressure of the engaging hydraulic pressure chamber 26 at the timing T7 is $P26_{(L6)}$, the hydraulic pressure of the disengaging hydraulic pressure chamber 27 at the timing T7 is $P27_{(L5)}$, the pressure receiving area of the section A is $S_A$, and the pressure receiving area of the section B is $S_B$, the pushing force D2 is defined by the following equation.

$$D2 = P26_{(L6)} \times S_B - P27_{(L5)} \times S_A \qquad (2)$$

In Equation 2, the hydraulic pressure $P27_{(L5)}$ of the disengaging hydraulic pressure chamber 27 is substantially the same as the hydraulic pressure level L5 which is the release pressure of the pressure reducing valve 6.

Thus, since the pushing force D2 larger than the pushing force D1 based on the pressure receiving area difference is applied, the piston 24 is pushed in the −X direction with a stronger force. This pushing force D2 is given to the friction plate unit 5 via the tip end surface 24C, and thus the second period ends.

Hydraulic Pressure Control Executed by Control Unit 100 in Automatic Stop and Automatic Start A hydraulic pressure control executed by the control unit 100 in the automatic stop and automatic start of the engine 85 is described with reference to FIGS. 9 to 11.

Figure 9:
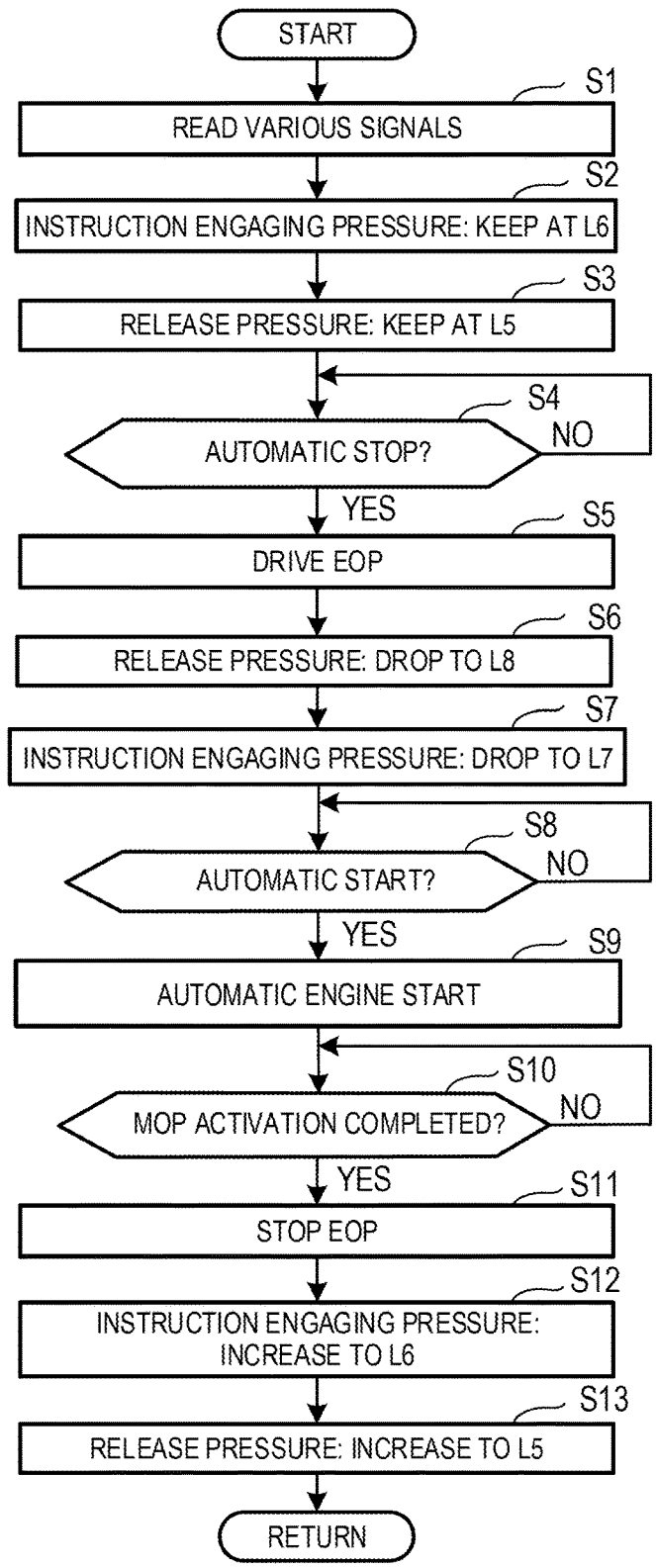
FIG. 9 is a flowchart illustrating a control method of the automatic transmission in an automatic stop and automatic start of a vehicle.

As illustrated in FIG. 9, the control unit 100 reads various signals also after the engaging operation described above (S1). Similar to the above case, the read signals include various information, such as the vehicle speed information, the accelerator opening information, the brake information, the gear range (gear shift) information, the oil temperature information, and the hydraulic pressure information.

Until a signal indicating the automatic stop of the engine 85 is inputted (while S4: NO), the hydraulic pressure controller 83 instructs the linear solenoid valve 7 to maintain the engaging pressure at the hydraulic pressure level L6 (S2), and instructs the linear solenoid valve 120 to maintain the release pressure of the pressure reducing valve 6 at the hydraulic pressure level L5 (S3). Note that FIGS. 9 to 11 illustrate the state from the timing T7 in FIG. 6, which relate to the hydraulic pressure control of the second brake 22.

Next, when a signal indicating the automatic stop of the engine 85 (the automatic stop signal of the engine 85) is inputted (S4: YES), the hydraulic pressure controller 83 of the control unit 100 outputs instructions to activate the EOP 84 (S5), drop the release pressure of the pressure reducing valve 6 to a hydraulic pressure level L8 (S6), and drop the engaging pressure to the hydraulic pressure level L7 (S7). For example, as illustrated in Part (a) of FIG. 11, when the automatic stop signal of the engine 85 is inputted at a timing T10, the MOP 81 is turned off. As illustrated in Parts (b) to (d) of FIG. 11, the EOP 84 is turned on, the release pressure is dropped to the hydraulic pressure level L8, and the instruction engaging pressure is also dropped to the hydraulic pressure level L7.

A method of determining whether to automatically stop the engine 85 is described with reference to FIG. 10A.

To determine whether to automatically stop the engine 85, whether an automatic stop switch is ON (S41), whether the vehicle speed is 0 km/h (S42), whether the gear range is the D-range or the N-range (S43), whether a brake (e.g., a footbrake) is ON (S44), whether an air conditioner is OFF (S45), whether a battery voltage is equal to or higher than a threshold Vth (S46), etc. are determined, and if the results of all of these determinations are "YES," the engine 85 is determined to be automatically stopped (S47).

Returning to FIG. 9, until a signal regarding the automatic start of the engine 85 is inputted (while S8: NO), the EOP 84 is maintained to be in the driving state, the release pressure of the pressure reducing valve 6 is kept at the hydraulic pressure level L8, and the instruction engaging pressure is kept at the hydraulic pressure level L7.

When a signal regarding the automatic start of the engine 85 is inputted (S8), the engine 85 is automatically started (S9). As a result, as illustrated in Part (a) of FIG. 11, the MOP 81 is turned on at a timing T11.

Next, a method of determining whether to automatically start the engine 85 is described with reference to FIG. 10B.

To determine whether to automatically start the engine 85, whether the automatic stop switch is changed to OFF (S81), whether the gear range is changed from the N-range to the D-range (S82), whether the brake is changed to OFF (S83), whether the air conditioner is changed to ON (S84), whether the battery voltage falls below the threshold Vth (S85), etc. are determined, and if the result of at least one of these determinations is "YES," the engine 85 is determined to be automatically started (S86).

Returning to FIG. 9, when the engine 85 is automatically started (S9) and the activation of the MOP 81 is completed (S10: YES), the EOP 84 is stopped (S11), the instruction engaging pressure is resumed to the hydraulic pressure level L6 (S12), and the release pressure of the pressure reducing valve 6 is resumed to the hydraulic pressure level L5 (S13).

Figure 11:
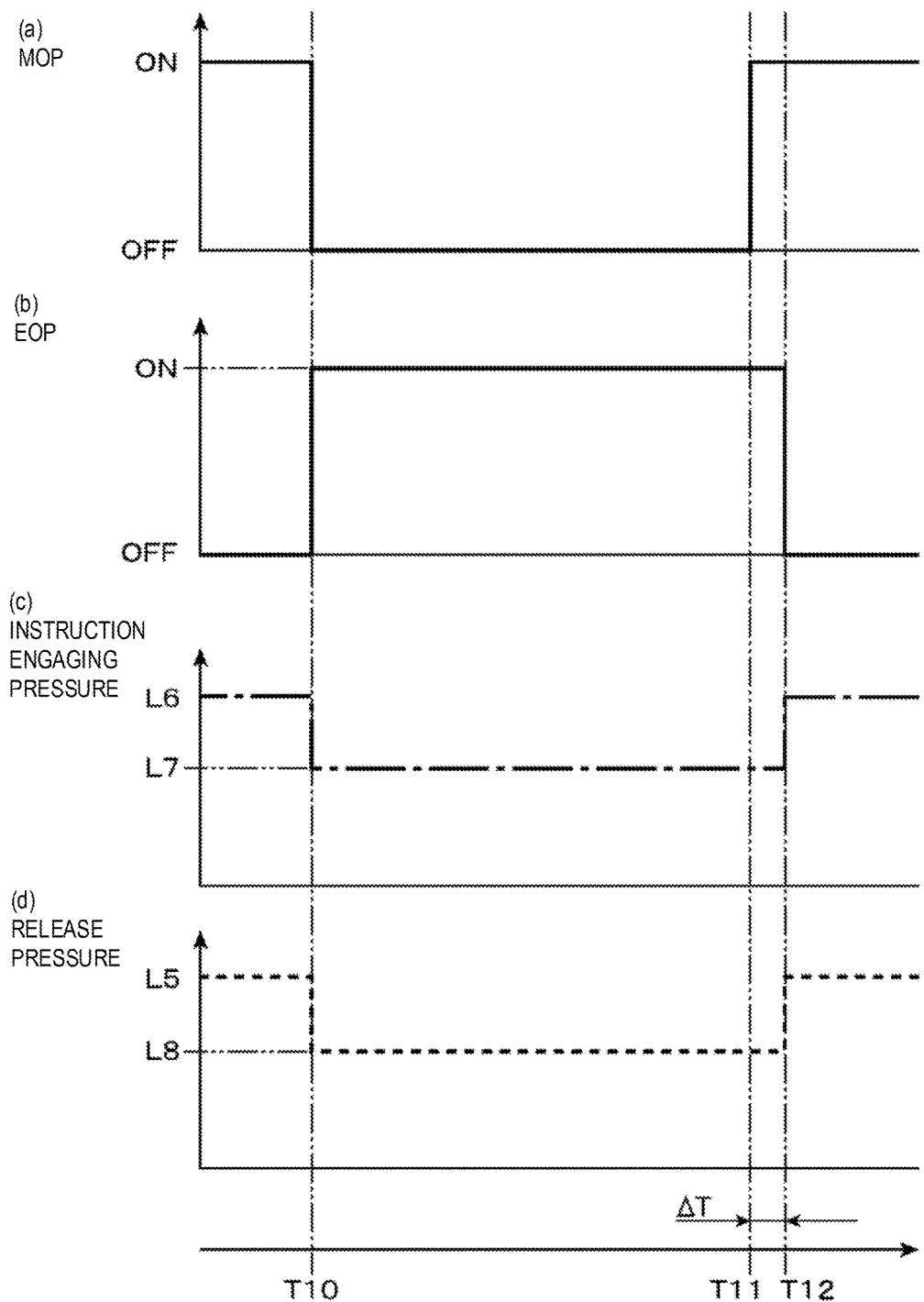
FIG. 11 shows time charts illustrating operations in the automatic stop and automatic start, in which Part (a) illustrates an operation of a mechanical oil pump, Part (b) illustrates an operation of an electric oil pump, Part (c) illustrates a state of an instruction engaging pressure, and Part (d) illustrates a state of a release pressure.

As illustrated in FIG. 11, even when the MOP 81 is turned on at the timing T11, the EOP 84 is not immediately turned off but is turned off after the activation of the MOP 81 is completed at a timing T12. This mode is adopted in consideration that the MOP 81 uses the engine 85 as its drive source and has a response delay in startup. A time difference ΔT between the timing T11 and the timing T12 is determined in consideration of a startup characteristic of rotation of the engine 85, the followability of the MOP 81 with respect to the engine rotation, etc. Therefore, if the startup of the engine is quick and the followability of the MOP 81 is sufficiently high, it may not be necessary to drive the EOP 84 in the period of ΔT.

Further, as illustrated in FIG. 11, the timing to resume the instruction engaging pressure to the hydraulic pressure level L6 and the timing to resume the release pressure of the pressure reducing valve 6 to the hydraulic pressure level L5 are also set to the timing T12. Note that in the period from the timing T11 to the timing T12 during the restart of the engine 85, the release pressure is set to the hydraulic pressure level L8 which is lower than the hydraulic pressure level L5 which is applied in a period other than the automatic stop period of the engine 85.

In this manner, the hydraulic pressure control in the automatic stop and automatic start is executed.

Pushing Force to Friction Plate Unit 5 in Automatic Stop State of Engine 85

In this embodiment, the release pressure of the pressure reducing valve 6 is reduced in the automatic stop state of the engine 85. Also in such a case, the pushing force of the friction plate unit 5 is maintained, which is described next with reference to FIGS. 12A and 12B.

Figure 12A:
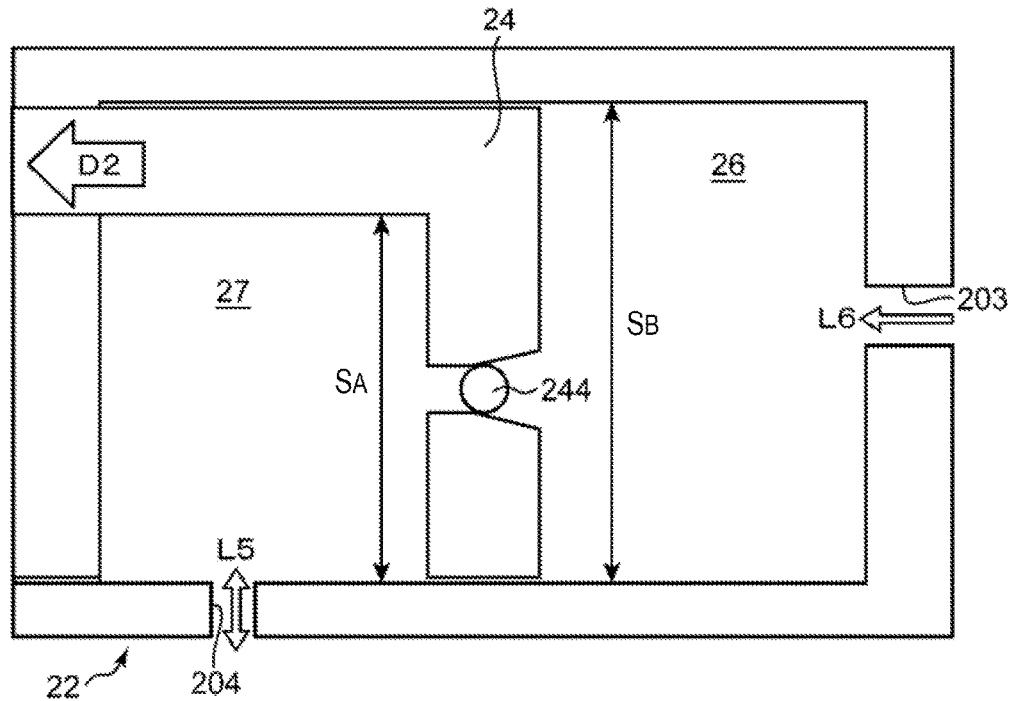
Figure 12B:
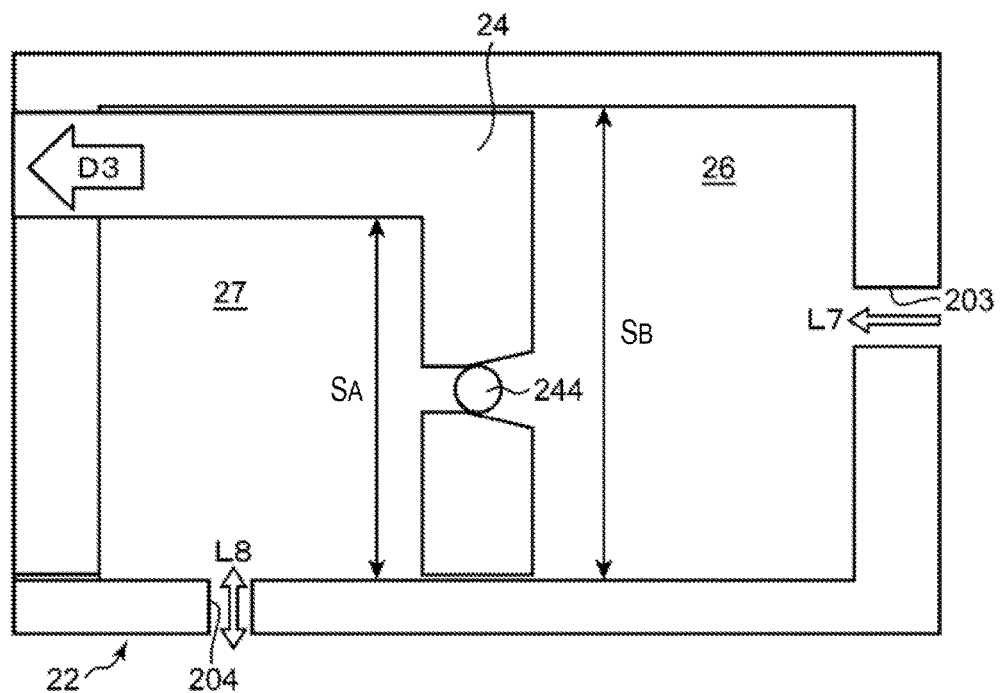

FIGS. 12A and 12B are schematic views illustrating states of the second brake 22, in which FIG. 12A illustrates a state before the automatic stop and FIG. 12B illustrates a state in the automatic stop state.

1. Before Automatic Stop

First, as illustrated in FIG. 12A, before the engine 85 is automatically stopped, a hydraulic pressure supply at the hydraulic pressure level L6 to the engaging hydraulic pressure chamber 26 through the first supply port 203 is performed (instructed). Therefore, the hydraulic pressure in the engaging hydraulic pressure chamber 26 is the hydraulic pressure level L6.

On the other hand, since the pressure limiting operation (pressure reducing operation) of the pressure reducing valve 6 has already been started by this point, the hydraulic pressure supply at the hydraulic pressure level L5 to the disengaging hydraulic pressure chamber 27 through the second supply port 204 is performed (instructed). Since the hydraulic pressure is higher in the engaging hydraulic pressure chamber 26 than the disengaging hydraulic pressure chamber 27, the through-hole is blocked by the pressure ball 244, and the engaging hydraulic pressure chamber 26 and the disengaging hydraulic pressure chamber 27 are hydraulically separated from each other.

The pushing force D2 to the friction plate unit 5 in the state illustrated in FIG. 12A is expressed by Equation 2 described above.

2. In Automatic Stop State

Next, as illustrated in FIG. 12B, in the automatic stop state of the engine 85, a hydraulic pressure supply at the hydraulic pressure level L7 to the engaging hydraulic pressure chamber 26 through the first supply port 203 is performed (instructed). Therefore, the hydraulic pressure in the engaging hydraulic pressure chamber 26 is the hydraulic pressure level L7 which is lower than the hydraulic pressure level L6.

On the other hand, since the release pressure of the pressure reducing valve 6 has already been reduced to the hydraulic pressure level L8 by this point, the hydraulic pressure supply to the disengaging hydraulic pressure chamber 27 through the second supply port 204 is performed (instructed) at the hydraulic pressure level L8. Note that similar to the state of FIG. 12A, the hydraulic pressure remains to be higher in the engaging hydraulic pressure chamber 26 than the disengaging hydraulic pressure chamber 27, the through-hole is blocked by the pressure ball 244, and the engaging hydraulic pressure chamber 26 and the disengaging hydraulic pressure chamber 27 are hydraulically separated from each other.

A pushing force D3 to the friction plate unit 5 in the state illustrated in FIG. 12B is expressed by following equation.

$$D3 = P26_{(L7)} \times S_B - P27_{(L8)} \times S_A \quad (3)$$

Note that in Equation 3, $P26_{(L7)}$ is the hydraulic pressure in the engaging hydraulic pressure chamber 26, and $P27_{(L8)}$ is the hydraulic pressure in the disengaging hydraulic pressure chamber 27. Also in Equation 3, for the sake of convenience, the biasing force of the return spring 28 is not taken into consideration.

3. Comparison

In this embodiment, the pushing force D3 may be made the same as the pushing force D2 by satisfying the following relationship.

$$P26_{(L6)} \times S_B - P27_{(L5)} \times S_A = P26_{(L7)} \times S_B - P27_{(L8)} \times S_A \quad (4)$$

By transforming Equation 4, the following relationship is obtained.

$$((P27_{(L5)} - P27_{(L8)})/(P26_{(L6)} - P26_{(L7)})) = (S_B/S_A) \quad (5)$$

Here, in Equation 5, $P26_{(L6)}$ is the supply hydraulic pressure of the MOP 81, and $P26_{(L7)}$ is the supply hydraulic pressure (instruction pressure) of the EOP 84. In the automatic stop state of the engine 85, it is desirable to save the power of the EOP 84 as much as possible, and it is also desirable to reduce the size of the EOP 84. Therefore, as illustrated in Part (c) of FIG. 11, the supply hydraulic pressure (instruction pressure) of the EOP 84 has the relationship of $(P26_{(L7)} < P26_{(L6)})$.

Here, in consideration of the ratio between the pressure receiving area $S_A$ of the first surface of the piston 24 and the pressure receiving area $S_B$ of the second surface, by setting the hydraulic pressure level L8 for the release pressure of the pressure reducing valve 6 so as to satisfy the relationship of Equation 5, the pushing force D3 may be set to be the same as the pushing force D2.

Note that the pushing force D3 is not necessarily be the same as the pushing force D2. Also in this case, the hydraulic pressure levels L6, L7, L5 and L8 may be defined based on the relationship of Equation 5.

Operations and Effects

According to the control method of the automatic transmission 1 of this embodiment, the pressure receiving area difference $(S_B - S_A)$ is provided between the first surface 24A and the second surface 24B of the piston 24. Therefore, the pushing force of the piston 24 regarding the engagement of the friction plates of the friction plate unit 5 is defined by an integration of the hydraulic pressure of the engaging hydraulic pressure chamber 26, the hydraulic pressure of the disengaging hydraulic pressure chamber 27, and the difference between the pressure receiving areas.

Further in this embodiment, the pressure reducing valve 6 is provided in the second oil path 75 to prevent the hydraulic pressure of the disengaging hydraulic pressure chamber 27 from exceeding the release pressure. Therefore, the pushing force of the piston 24 regarding the engagement of the friction plates of the friction plate unit 5 after the pressure reducing valve 6 starts the pressure limiting operation (pressure reducing operation) is expressed by Equations 2 and 3.

Further with the control method of the automatic transmission 1 of this embodiment, the release pressure of the pressure reducing valve 6 in the automatic stop state of the engine 85 is changed to the hydraulic pressure level L8, which is lower than the level during the drive of the engine 85. Therefore, in the case of maintaining the pushing force D3 of the piston 24 in the automatic stop state of the engine 85 to be the same as the pushing force D2 of the piston 24 during the drive of the engine 85, as illustrated in Equation 5 described above, the hydraulic pressure of the engaging hydraulic pressure chamber 26 may also be dropped according to the reduced amount of release pressure of the pressure reducing valve 6.

Therefore, according to the control method of the automatic transmission 1 of this embodiment, the supply hydraulic pressure in the automatic stop state of the engine 85 is kept low, and the EOP 84 is reduced in size and power consumption. Also with the control method of the automatic transmission 1 of this embodiment, since the engaged state of the friction plates of the friction plate unit 5 is maintained even in the automatic stop state of the engine 85, the vehicle shock in the restart of the engine 85 is reduced.

Further with the control method of the automatic transmission 1 of this embodiment, the state where the hydraulic oil is also charged in the disengaging hydraulic pressure chamber 27 is maintained in the automatic stop state of the engine 85. In other words, in this embodiment, the state where both the engaging hydraulic pressure chamber 26 and the disengaging hydraulic pressure chamber 27 are charged with hydraulic oil is maintained even in the automatic stop state of the engine 85. Thus, an accurate control of the pushing force to the friction plates of the friction plate unit 5 immediately after the engine 85 is restarted is possible.

Further with the control method of the automatic transmission 1 of this embodiment, also in the automatic stop state of the engine 85, the pushing force D3 of the piston 24 regarding the engagement of the friction plates of the friction plate unit 5 may be maintained to be the same as the level during the drive of the engine 85 by satisfying the relationship of Equation 5. Thus, a response delay at the time of the engaging operation of the automatic transmission 1 in the restart of the engine, which occurs with the configuration of JP2011-208699A, is reduced.

Therefore, according to this embodiment, the reductions of the EOP 84 in size and power consumption are achieved and the vehicle shock in the restart of the engine 85 is reduced.

Note that in this embodiment, as described with reference to FIGS. 9 to 11, in the period during which the engine 85 is automatically started, which is from the timing T11 to the timing T12, the release pressure of the pressure reducing valve 6 is kept at the hydraulic pressure level L8. In other words, the release pressure of the pressure reducing valve 6 from the timing T11 to the timing T12 is changed to be lower than the release pressure in the period other than the period in the automatic stop state of the engine 85 which is from the timing T10 to the timing T11.

For example, from the timing T10 to the timing T12, the release pressure of the pressure reducing valve 6 is set to the hydraulic pressure level L8 so as to be lower than the hydraulic pressure level L5 which is the release pressure in the other period. Thus, the engaged state of the friction plates of the friction plate unit 5 is stably maintained without being affected by the response delay of the hydraulic pressure at the time of startup of the MOP 81. Therefore, according to this embodiment, the reduction in the vehicle shock in the restart of the engine 85 and the reduction of the response delay at the time of the engaging operation of the automatic transmission 1 are achieved.

Supplemental Description Regarding Instruction Pressure Setting

The setting of the instruction pressure from the hydraulic pressure controller 83 to the linear solenoid valve is supplementarily described with reference to FIGS. 13A and 13B.

Figure 13A:
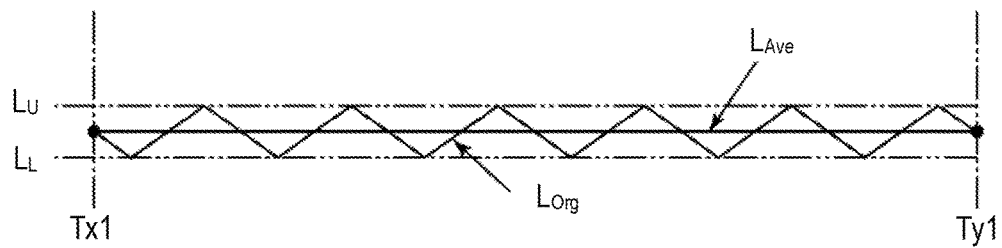
FIGS. 13A and 13B are schematic diagrams illustrating settings of an instruction pressure.

FIG. 13A schematically illustrates the instruction engaging pressure in the first period from the timing T0 to the timing T5 in FIG. 6. The instruction to the linear solenoid valve from the hydraulic pressure controller 83 is performed by, for example, a current control. Therefore, as illustrated in FIG. 13A, an actual instruction pressure $L_{Org}$ between a timing Tx1 and a timing Ty1 varies between a value $L_L$ and a value $L_U$. In this embodiment, the instruction pressure $L_{Org}$ with such a variation is described as an instruction pressure $L_{Ave}$ which is an average value of the varying instruction pressure $L_{Org}$.

Figure 13B:
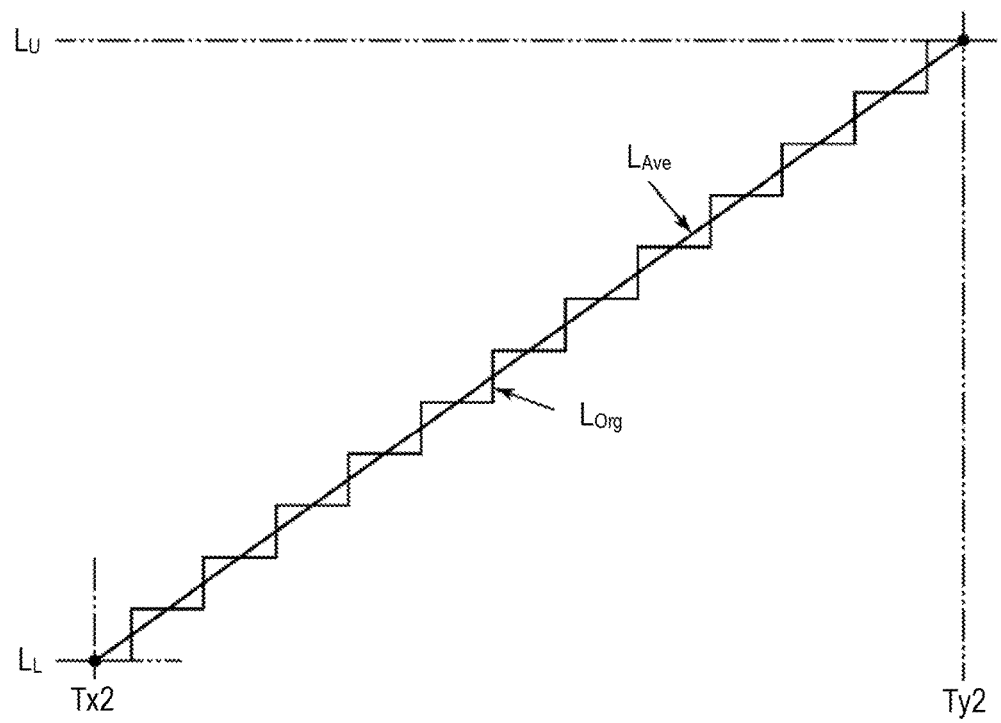

FIG. 13B schematically illustrates the instruction engaging pressure in the second period from the timing T5 to the timing T7 in FIG. 6. As illustrated in FIG. 13B, the actual instruction pressure $L_{Org}$ between a timing Tx2 and a timing Ty2 increases from the value $L_L$ to the value $L_U$ in a stepwise fashion. In the embodiment etc., such an actual instruction pressure $L_{Org}$ is described as an instruction pressure $L_{Ave}$ which is a regression line (linear regression line in FIG. 13B).

Note that the instruction engaging pressure in the second period may be expressed by a curved regression line depending on the mode of the actual instruction pressure.

This supplemental matter may also be adopted to the instruction pressures for the linear solenoid valves 120 to 124.

Modification

A control method of the automatic transmission 1 according to a modification is described with reference to FIG. 14 which is a part of a time chart illustrating the control method of the automatic transmission 1 of this modification, illustrating a change state of the release pressure of the pressure reducing valve 6 in the automatic stop of the engine 85.

The control method of the automatic transmission 1 of this modification is an example of a case where the gear range of the automatic transmission is the D- (drive) range in the automatic stop state of the engine 85.

Figure 14:
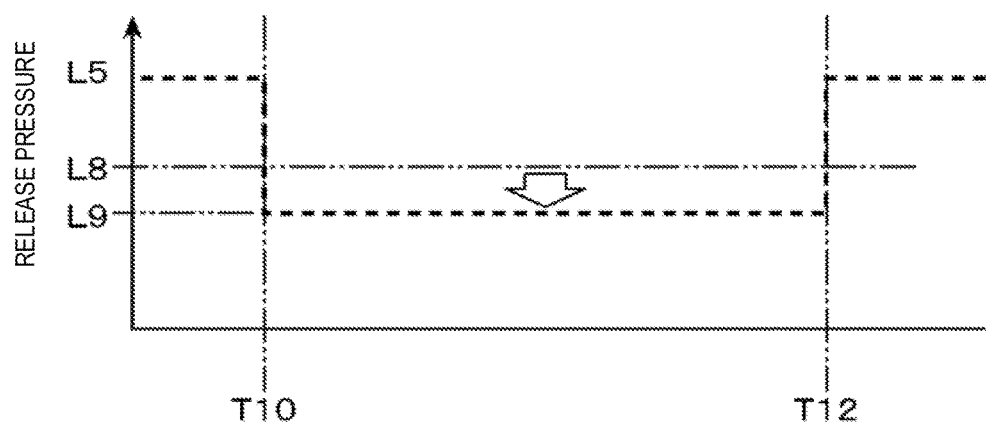
FIG. 14 is a part of a time chart illustrating a control method of the automatic transmission according to one modification, illustrating a state of a release pressure in the automatic stop.

As illustrated in FIG. 14, when a signal indicating the automatic stop of the engine 85 is inputted at the timing T10, the hydraulic pressure controller 83 of the control unit 100 outputs an instruction to drop the release pressure of the pressure reducing valve 6 to a hydraulic pressure level L9. Note that this modification is different from the above embodiment in the release pressure of the pressure reducing valve 6 in the automatic stop state of the engine 85, otherwise is similar to the above embodiment. Also similar to the above embodiment, the MOP 81 is turned off and the EOP 84 is turned on at the timing T10.

Here, in this modification, since the gear range of the automatic transmission is the D-range, the release pressure of the pressure reducing valve 6 is lower compared to when the gear range is the N-range. For example, when the gear range of the automatic transmission is the N-range in the automatic stop state of the engine 85, the release pressure of the pressure reducing valve 6 is dropped to the hydraulic pressure level L8, whereas when the gear range is the D-range as in this modification, the release pressure of the pressure reducing valve 6 is dropped even lower to the hydraulic pressure level L9.

The release pressure of the pressure reducing valve 6 is kept at the hydraulic pressure level L9 until the timing T12 at which the activation of the MOP 81 is completed, and is resumed to the hydraulic pressure level L5 at the timing T12.

According to the control method of the automatic transmission 1 of this modification, when the engine 85 is automatically stopped in the state where the gear range of the automatic transmission is the D-range, by setting the release pressure of the pressure reducing valve 6 further lower at the hydraulic pressure level L9, the engagement force between the friction plates of the friction plate unit 5 is firmly maintained. Therefore, in this case, the vehicle shock is reduced in the restart of the engine 85 and a smooth start of the vehicle is achieved.

On the other hand, when the engine 85 is automatically stopped in the state where the gear range of the automatic transmission is the N-range, by setting the release pressure of the pressure reducing valve 6 relatively high at the hydraulic pressure level L8, the engagement force between the friction plates of the friction plate unit 5 is reduced but remains. Therefore, even when the engine 85 is restarted in this state, a situation where the vehicle erroneously starts travelling is avoidable. Thus, according to the control method of the automatic transmission 1 of this modification, a high safety is secured while following the input instruction from a vehicle operator.

Another Embodiment

Figure 15:
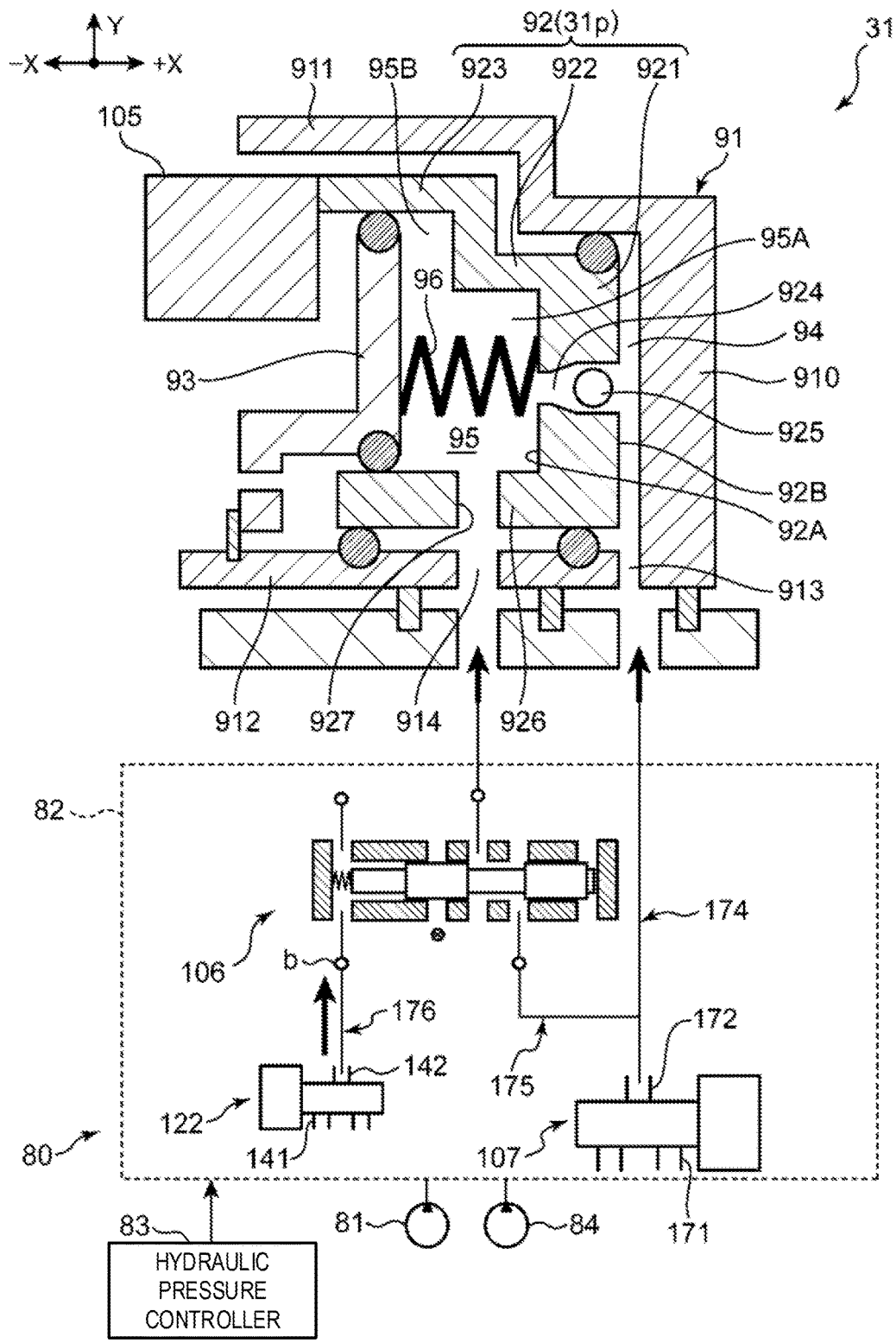
FIG. 15 is a view illustrating a schematic cross section of a structure of a first clutch that is one of the frictional engageable elements, and illustrating a configuration of a hydraulic mechanism of the first clutch.

In the above embodiment and modification, the second brake 22 is described as one example of the frictional engageable element. In the following embodiment, a clutch is described as another example of the frictional engageable element. FIG. 15 is a view schematically illustrating a configuration of the first clutch 31 which is one of the frictional engageable elements provided to the automatic transmission 1.

As illustrated in FIG. 15, the first clutch 31 includes a drum 91, a piston 92, a sealing ring 93, an engaging hydraulic pressure chamber 94, and a disengaging hydraulic pressure chamber 95. The first clutch 31 engages and disengages a friction plate unit 105. A pressure reducing valve 106, the linear solenoid valve 107, and the linear solenoid valve 122 are applied as a hydraulic mechanism of the first clutch 31. The pressure reducing valve 106, the linear solenoid valve 107, and the linear solenoid valve 122 have the same structures as those of the pressure reducing valve 6, the linear solenoid valve 7, and the linear solenoid valve 122 of the second brake 22.

Further, a hydraulic mechanism 80 is also attached to the first clutch 31. The hydraulic mechanism 80 includes an MOP 81, an EOP 84, a hydraulic circuit 82, and a hydraulic pressure controller 83 for controlling the hydraulic circuit 82.

Note that the connection mode of the MOP 81 and the EOP 84 with respect to the each of input ports 171 and 141 of the linear solenoid valves 107 and 122 is the same as the embodiment and modifications.

The drum 91 is supported by the transmission case 2 to be rotatable about a center axis of the automatic transmission 1. The drum 91 includes a circular plate part 910 extending in the Y directions, an outer cylindrical part 911 extending from a radially outer edge of the circular plate part 910 and having a larger diameter than the circular plate part 910, and an inner cylindrical part 912 coaxially disposed on the inner side of the outer cylindrical part 911. The inner cylindrical part 912 is formed with a first supply port 913 and a second supply port 914 for a hydraulic pressure supply.

The piston 92 is a member corresponding to the piston 31p illustrated in FIG. 1, and includes a pressure receiving part 921, a small cylindrical part 922, and a large cylindrical part 923. The pressure receiving part 921 has a first surface 92A on the friction plate unit 105 side and a second surface 92B on the opposite side from the first surface 92A, and the both surfaces receive hydraulic pressure. The pressure receiving part 921 includes a through-hole 924 penetrating in the axial directions, a pressure ball 925 (restricting mechanism) is disposed inside the through-hole 924. An inner cylindrical part 926 projects from a radially inner edge of the pressure receiving part 921 and extends in the −X direction. The inner cylindrical part 926 is bored a third supply port 927 communicating with the second supply port 914. An edge of the large cylindrical part 923 on the −X side pushes the friction plate unit 105. The sealing ring 93 is disposed between the piston 92 and the friction plate unit 105, and blocks a gap between the large cylindrical part 923 and the inner cylindrical part 926.

The engaging hydraulic pressure chamber 94 (hydraulic oil pressure chamber) is space between (the second surface 92B side of) the pressure receiving part 921 of the piston 92 and the circular plate part 910 of the drum 91, and receives hydraulic pressure from a first oil path 174 through the first supply port 913. The disengaging hydraulic pressure chamber 95 (centrifugal balance hydraulic pressure chamber) is space defined by (the first surface 92A side of) the pressure receiving part 921 of the piston 92, the small and large cylindrical parts 922 and 923, and the sealing ring 93, and receives hydraulic pressure from a second oil path 175 through the second and third supply ports 914 and 927. A return spring 96 for elastically biasing the piston 92 in the +X direction is disposed inside the disengaging hydraulic pressure chamber 95. When causing the friction plate unit 105 to change from the disengaged state to the engaged state, hydraulic pressure is supplied from an output port 172 of the linear solenoid valve 107 to the engaging hydraulic pressure chamber 94 and the disengaging hydraulic pressure chamber 95 through the first oil path 174 and the second oil path 175 simultaneously.

Similar to the pressure reducing valve 6, the pressure reducing valve 106 is built in the second oil path 175 and adjusts the hydraulic pressure of the disengaging hydraulic pressure chamber 95 to be at or below a given value (a set pressure of the pressure reducing valve 106). The linear solenoid valve 122 is connected to a port b of the pressure reducing valve 106 via a third oil path 176.

Similar to the linear solenoid valve 120, the linear solenoid valve 122 is a hydraulic pressure (release pressure) control valve for supplying and discharging hydraulic pressure to and from a spring chamber of the pressure reducing valve 106. Thus, the linear solenoid valve 122 functions as a set pressure (release pressure) control valve for changing a set pressure (release pressure) of the pressure reducing valve 106. The input port 141 of the linear solenoid valve 122 receives hydraulic oil from the MOP 81 and the EOP 84. A spool (not illustrated) of the linear solenoid valve 122 operates in response to a power distribution to a coil thereof, and the operation of the spool causes the input port 141 and an output port 142 to communicate with each other when supplying the hydraulic pressure to the spring chamber of the pressure reducing valve 106, and causes the output port 142 and a drain port to communicate with each other when discharging the hydraulic pressure. The linear solenoid valve 122 also adjusts an amount of hydraulic oil discharged from the output port 142 based on a control of the power distribution amount to the coil.

The first surface 92A of the piston 92 receives hydraulic pressure from the disengaging hydraulic pressure chamber 95 and the second surface 92B receives hydraulic pressure from the engaging hydraulic pressure chamber 94. Here, a pressure receiving area of the second surface 92B of the piston 92 is set larger than a pressure receiving area of the first surface 92A. The small cylindrical part 922 and the large cylindrical part 923 extend continuously to the pressure receiving part 921 in this order in the −X direction. Accordingly, the disengaging hydraulic pressure chamber 95 has a small volume section 95A on the +X side (inside of the small cylindrical part 922), and a large volume section 95B on the −X side (inside of the large cylindrical part 923). The first clutch 31 is required to have a function in the disengaging hydraulic pressure chamber 95 to cancel centrifugal hydraulic pressure of the engaging hydraulic pressure chamber 94.

The operation of the first clutch 31 having the above structure is the same as the operation of the second brake 22 described in the above embodiment. For example, when hydraulic pressure is supplied to the engaging hydraulic pressure chamber 94 and the disengaging hydraulic pressure chamber 95, the piston 92 moves in the −X direction (engaging direction) by a comparatively small pushing force produced based on a pressure receiving area difference between the first and second surfaces 92A and 92B. In an early stage of the engagement, the movement of the piston 92 based on the pressure receiving area difference continues for a certain period of time. Further, when the actual engaging pressure becomes the release pressure of the pressure reducing valve 106 or above, the pressure reducing valve 106 starts the operation to limit hydraulic pressure of the disengaging hydraulic pressure chamber 95 at the release pressure of the pressure reducing valve 106 and the second surface 92B of the piston 92 receives a large pushing force.

Also in the first clutch 31, when the engine 85 is automatically stopped, the release pressure of the pressure reducing valve 6 is changed to a lower hydraulic pressure level than the level during the drive of the engine 85. Therefore, the pushing force of the piston 92 to the friction plate unit 105 in the automatic stop state of the engine 85 is maintained the same as the pushing force of the piston 92 during the drive of the engine 85. For example, as described above, also in a case of causing the pushing force to the friction plates of the friction plate unit 105 in the automatic stop state of the engine 85 to the same as that during the drive of the engine 85, the hydraulic pressure in the engaging hydraulic pressure chamber 94 is reduced by the reduced amount of the release pressure of the pressure reducing valve 106.

Therefore, also with the control method of the first clutch 31, the hydraulic pressure supplied to the engaging hydraulic pressure chamber 94 of the first clutch 31 in the automatic stop state of the engine 85 is kept low, thereby reductions of the EOP 84 in size and power consumption are achieved. Additionally, since the engaged state of the friction plates of the friction plate unit 105 is maintained also in the automatic stop state of the engine 85, the vehicle shock in the restart of the engine 85 is reduced.

Further with the control method of the first clutch 31 of this embodiment, even in the automatic stop state of the engine 85, the pushing force of the piston 92 regarding the engagement of the friction plates of the friction plate unit 105 is maintained the same as that during the drive of the engine 85. Therefore, the response delay at the time of the engaging operation of the automatic transmission 1 in the restart of the engine, that occurs with the configuration of JP2011-208699A, is reduced.

Thus, also with the control method of the first clutch 31 of this embodiment, the size and power consumption of the EOP 84 are reduced, the vehicle shock in the restart of the engine 85 is reduced, and the response delay at the time of the engaging operation of the automatic transmission 1 is reduced.

Other Modifications

In the above embodiments, the planetary-gear-type automatic transmission is described as an example; however, the present invention is not limited to this. For example, the present invention may be applied to a Continuously Variable Transmission (CVT) and a Dual Clutch Transmission (DCT).

Further in the above embodiments and modifications, the electric oil pump 84 is applied as the hydraulic pressure supply device for supplying hydraulic pressure to the frictional engageable element in the automatic stop state of the engine 85; however, the present invention is not limited to this. For example, a hydraulic accumulator may be employed as the hydraulic pressure supply device. Also in this case, by employing the above control method, the hydraulic pressure supply device may be downsized. Although the type of the hydraulic accumulator is not particularly limited, for example, any of a bladder accumulator, a piston accumulator, a metal bellows accumulator, and a diaphragm accumulator may be employed.

In the above embodiments, in the control of the engaging operation, the given instruction pressure is instructed to the hydraulic pressure control valve (linear solenoid valve) in the first period, and to maintain it for the first period. Further the linearly increasing pressure is instructed to the hydraulic pressure control valve in the second period.

However, the present invention is not limited to this. For example, the instruction pressure in the first period may have an inclination, and the instruction pressure in the second period may increase with time in a quadratic or cubic curve manner. Note that since the first and second periods are extremely short (e.g., 100 msec. to 600 msec.), maintaining the first instruction pressure at the given value and linearly increasing with time the second instruction pressure is desirable in view of simplifying the control.

Further in the above embodiments, the automatic transmission which receives the drive force of the engine without using a torque converter (fluid transmitter) is described as an example; however, the present invention may be applied to an automatic transmission which receives the drive force of the engine through a torque converter.

Moreover, for when the engine 85 is in the automatic stop state while the gear range is the D-range, although in the above modifications the second brake 22 is described as one example, the first clutch 31 may be applied as well.

Further, in the above embodiments and modifications, the set pressure (release pressure) of the pressure reducing valve is sharply reduced from the hydraulic pressure level L5 to the hydraulic pressure level L8 at the timing T10 (in the automatic stop state of the engine 85) as illustrated in FIG. 11 etc.; however, the present invention is not limited to this. For example, the set pressure may be reduced at an inclination (with time). This similarly applies to the case of resuming the release pressure of the pressure reducing valve 6 from the hydraulic pressure level L8 to the hydraulic pressure level L5 at the timing T12.

In the above embodiments and modifications, the supply and discharge of hydraulic pressure to and from the spring chamber of the pressure reducing valve is performed by the linear solenoid valve; however, in the present invention, the spring of the pressure reducing valve is not an essential component. In other words, the present invention may adopt a mechanism capable of controlling the set pressure (release pressure) of the pressure reducing valve simply with hydraulic pressure supplied from a linear solenoid valve.

Figure 10A:
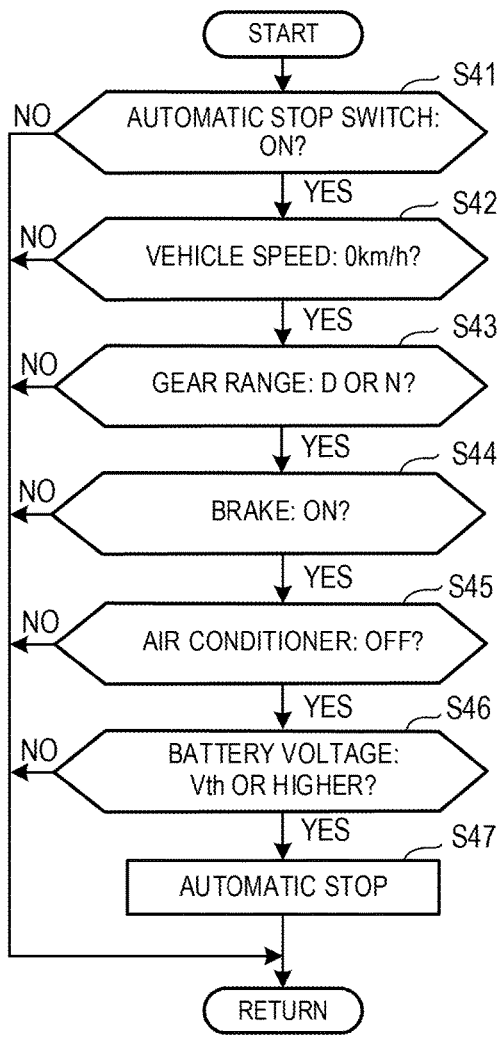
FIG. 10A is a flowchart illustrating a determination method of the automatic stop in FIG. 9.
Figure 10B:
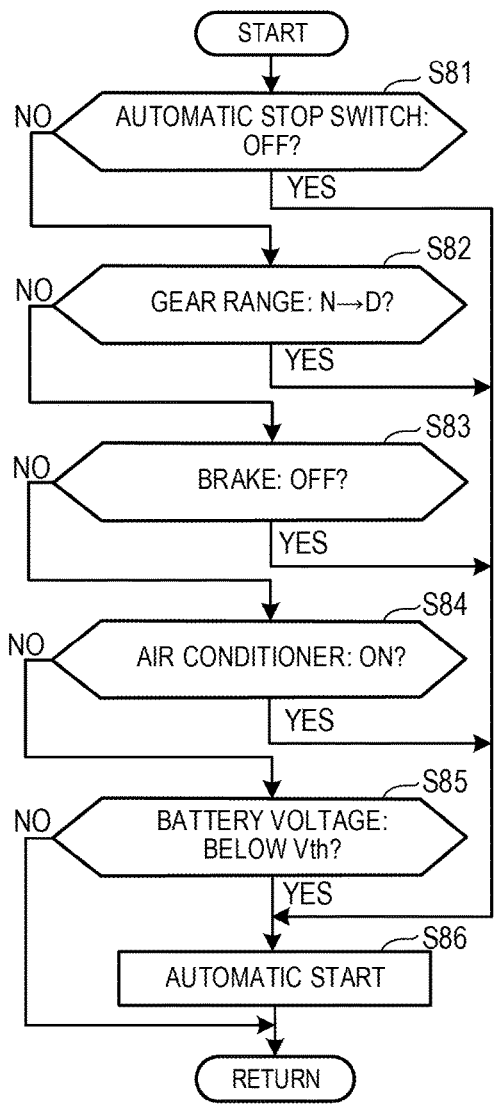
FIG. 10B is a flowchart illustrating a determination method of the automatic start in FIG. 9.

Furthermore, in the above embodiment, the automatic stop condition and the automatic start condition of the engine 85 are as illustrated in the flowcharts of FIGS. 10A and 10B; however, the present invention is not limited to this. For example, any of an inclination angle of the vehicle body, a temperature of engine coolant, the oil temperature of the hydraulic oil, an opening state of a bonnet, and whether a handle operation is performed may be one of the automatic stop condition and automatic start condition of the engine.

It should be understood that the embodiments herein are illustrative and not restrictive, since the scope of the invention is defined by the appended claims rather than by the description preceding them, and all changes that fall within metes and bounds of the claims, or equivalence of such metes and bounds thereof, are therefore intended to be embraced by the claims.

DESCRIPTION OF REFERENCE CHARACTERS

1 Automatic Transmission
5, 105 Friction Plate Unit
6, 106 Pressure Reducing Valve
7, 107-110 Linear Solenoid Valve (Hydraulic Pressure Control Valve)
21 First Brake
22 Second Brake
26 Engaging Hydraulic Pressure Chamber
27 Disengaging Hydraulic Pressure Chamber
31 First Clutch
32 Second Clutch
33 Third Clutch
51 Drive Plate (Friction Plate)
52 Driven Plate (Friction Plate)
74, 174 First Oil Path
75, 175 Second Oil Path
76, 176 Third Oil Path
80 Hydraulic Mechanism
81 Mechanical Oil Pump
82 Hydraulic Circuit
83 Hydraulic Pressure Controller
84 Electric Oil Pump (Hydraulic Pressure Supply Device)
85 Engine
86 Motor
94 Hydraulic Oil Pressure Chamber (Engaging Hydraulic Pressure Chamber)
95 Centrifugal Balance Hydraulic Pressure Chamber (Disengaging Hydraulic Pressure Chamber)
100 Control Unit (Control Device)
116 Hydraulic Pressure Sensor
120-124 Linear Solenoid Valve (Release Pressure Control Valve)
243, 924 Through-hole
244, 925 Pressure Ball (Restricting Mechanism)

What is claimed is:

1. A method of controlling an automatic transmission mounted on a vehicle having an automatic engine stop mechanism for automatically stopping an engine when a given automatic stop condition is satisfied, and automatically starting the engine when a given restart condition is satisfied in a state where the engine is automatically stopped, the automatic transmission including:

a controller including a processor;
a piston having a first surface and a second surface opposite from each other in an axial direction of the piston, and movable in the axial direction;
a plurality of friction plates disposed on a first surface side of the piston;
an engaging hydraulic pressure chamber for applying hydraulic pressure to the second surface of the piston and directing the piston to an engaging position to push the plurality of friction plates to be engaged with each other in an engaged state;
a disengaging hydraulic pressure chamber for applying hydraulic pressure to the first surface of the piston and directing the piston to a disengaging position to cause the plurality of friction plates to be in a disengaged state;
a hydraulic pressure control valve operatively coupled to the processor and having an output port of hydraulic pressure, and for supplying and discharging hydraulic pressure to and from the engaging hydraulic pressure chamber and the disengaging hydraulic pressure chamber;
a first oil path communicating the output port of the hydraulic pressure control valve with the engaging hydraulic pressure chamber;
a second oil path communicating the output port with the disengaging hydraulic pressure chamber;
a pressure reducing valve disposed in the second oil path and for preventing hydraulic pressure of the disengaging hydraulic pressure chamber from exceeding a given set pressure;
a hydraulic pressure supply device for supplying hydraulic pressure to an input port of the hydraulic pressure control valve when the engine is in an automatic stop state; and
a mechanical oil pump using the engine as a drive source and for supplying hydraulic pressure to the input port while the engine is driving, the second surface having a larger area for receiving hydraulic pressure than an area of the first surface for receiving hydraulic pressure,
the method comprising adjusting a set pressure of the pressure reducing valve to be lower when the engine is in the automatic stop state than while the engine is driving.

2. The method of claim 1, wherein the hydraulic pressure supply device is an electric oil pump.

3. The method of claim 2, wherein when the engine is in the automatic stop state, hydraulic pressure is supplied from the hydraulic pressure supply device so as to cause the plurality of friction plates to reach the engaged state.

4. The method of claim 3, wherein
information regarding a gear range of the automatic transmission is inputted into the processor, and
when the information regarding the gear range of the automatic transmission indicates a traveling range in the automatic stop state of the engine, the set pressure is reduced to be lower than when the information indicates a non-traveling range.

5. The method of claim 4, wherein when the engine is in the automatic stop state, a two-chamber charging state where oil is also charged into the disengaging hydraulic pressure chamber is maintained.

6. The method of claim 3, wherein when the engine is in the automatic stop state, a two-chamber charging state where oil is also charged into the disengaging hydraulic pressure chamber is maintained.

7. The method of claim 2, wherein
information regarding a gear range of the automatic transmission is inputted into the processor, and
when the information regarding the gear range of the automatic transmission indicates a traveling range in the automatic stop state of the engine, the set pressure is reduced to be lower than when the information indicates a non-traveling range.

8. The method of claim 7, wherein when the engine is in the automatic stop state, a two-chamber charging state where oil is also charged into the disengaging hydraulic pressure chamber is maintained.

9. The method of claim 2, wherein when the engine is in the automatic stop state, a two-chamber charging state where oil is also charged into the disengaging hydraulic pressure chamber is maintained.

10. The method of claim 1, wherein when the engine is in the automatic stop state, hydraulic pressure is supplied from the hydraulic pressure supply device so as to cause the plurality of friction plates to reach the engaged state.

11. The method of claim 10, wherein
information regarding a gear range of the automatic transmission is inputted into the processor, and
when the information regarding the gear range of the automatic transmission indicates a traveling range in the automatic stop state of the engine, the set pressure is reduced to be lower than when the information indicates a non-traveling range.

12. The method of claim 11, wherein when the engine is in the automatic stop state, a two-chamber charging state where oil is also charged into the disengaging hydraulic pressure chamber is maintained.

13. The method of claim 10, wherein when the engine is in the automatic stop state, a two-chamber charging state where oil is also charged into the disengaging hydraulic pressure chamber is maintained.

14. The method of claim 1, wherein
information regarding a gear range of the automatic transmission is inputted into the processor, and
when the information regarding the gear range of the automatic transmission indicates a traveling range in the automatic stop state of the engine, the set pressure is reduced to be lower than when the information indicates a non-traveling range.

15. The method of claim 14, wherein when the engine is in the automatic stop state, a two-chamber charging state where oil is also charged into the disengaging hydraulic pressure chamber is maintained.

16. The method of claim 1, wherein when the engine is in the automatic stop state, a two-chamber charging state where oil is also charged into the disengaging hydraulic pressure chamber is maintained.

17. A method of controlling an automatic transmission mounted on a vehicle having an automatic engine stop mechanism for automatically stopping an engine when a given automatic stop condition is satisfied, and automatically starting the engine when a given restart condition is satisfied in a state where the engine is automatically stopped, the automatic transmission including:
a piston having a first surface and a second surface opposite from each other in an axial direction of the piston, and movable in the axial direction;
a plurality of friction plates disposed on a first surface side of the piston;
an engaging hydraulic pressure chamber for applying hydraulic pressure to the second surface of the piston and directing the piston to an engaging position to push the plurality of friction plates to be engaged with each other in an engaged state;

a disengaging hydraulic pressure chamber for applying hydraulic pressure to the first surface of the piston and directing the piston to a disengaging position to cause the plurality of friction plates to be in a disengaged state;

a hydraulic pressure control valve having an output port of hydraulic pressure, and for supplying and discharging hydraulic pressure to and from the engaging hydraulic pressure chamber and the disengaging hydraulic pressure chamber;

a first oil path communicating the output port of the hydraulic pressure control valve with the engaging hydraulic pressure chamber;

a second oil path communicating the output port with the disengaging hydraulic pressure chamber;

a pressure reducing valve disposed in the second oil path and for preventing hydraulic pressure of the disengaging hydraulic pressure chamber from exceeding a given set pressure;

a hydraulic pressure supply device for supplying hydraulic pressure to an input port of the hydraulic pressure control valve when the engine is in an automatic stop state; and a mechanical oil pump using the engine as a drive source and for supplying hydraulic pressure to the input port while the engine is driving, the second surface having a larger area for receiving hydraulic pressure than an area of the first surface for receiving hydraulic pressure, the method comprising adjusting a set pressure of the pressure reducing valve to be lower in a first period of automatically starting the engine than in a period other than both of the first period and the period in which the engine is in the automatic stop state.

18. A control device of an automatic transmission mounted on a vehicle having an automatic engine stop mechanism for automatically stopping an engine when a given automatic stop condition is satisfied, and automatically starting the engine when a given restart condition is satisfied in a state where the engine is automatically stopped, the automatic transmission including:

a piston having a first surface and a second surface opposite from each other in an axial direction of the piston, and movable in the axial direction;

a plurality of friction plates disposed on a first surface side of the piston;

an engaging hydraulic pressure chamber for applying hydraulic pressure to the second surface of the piston and directing the piston to an engaging position to push the plurality of friction plates to be engaged with each other in an engaged state;

a disengaging hydraulic pressure chamber for applying hydraulic pressure to the first surface of the piston and directing the piston to a disengaging position to cause the plurality of friction plates to be a disengaged state;

a hydraulic pressure control valve having an output port of hydraulic pressure, and for supplying and discharging hydraulic pressure to and from the engaging hydraulic pressure chamber and the disengaging hydraulic pressure chamber;

a first oil path communicating the output port of the hydraulic pressure control valve with the engaging hydraulic pressure chamber;

a second oil path communicating the output port with the disengaging hydraulic pressure chamber;

a pressure reducing valve disposed in the second oil path and for preventing hydraulic pressure of the disengaging hydraulic pressure chamber from exceeding a given set pressure;

a hydraulic pressure supply device for supplying hydraulic pressure to an input port of the hydraulic pressure control valve when the engine is in an automatic stop state; and a mechanical oil pump using the engine as a drive source and for supplying hydraulic pressure to the input port while the engine is driving, the second surface having a larger area for receiving hydraulic pressure than an area of the first surface for receiving hydraulic pressure, the control device including a processor configured to execute instructions to adjust a set pressure of the pressure reducing valve to be lower when the engine is in the automatic stop state than while the engine is driving, or to be lower in a first period of automatically starting the engine than in a period other than both of the first period and the period in which the engine is in the automatic stop state.

* * * * *